US011847357B2

(12) United States Patent
Soma

(10) Patent No.: US 11,847,357 B2
(45) Date of Patent: Dec. 19, 2023

(54) INFORMATION PROCESSING APPARATUS AND INFORMATION PROCESSING METHOD

(71) Applicant: CANON KABUSHIKI KAISHA, Tokyo (JP)

(72) Inventor: Takahiro Soma, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/306,634

(22) Filed: May 3, 2021

(65) Prior Publication Data

US 2021/0349667 A1 Nov. 11, 2021

(30) Foreign Application Priority Data

May 7, 2020 (JP) .................................. 2020-082153

(51) Int. Cl.
*G06F 3/12* (2006.01)
*G06F 40/263* (2020.01)

(52) U.S. Cl.
CPC .......... *G06F 3/1205* (2013.01); *G06F 3/1253* (2013.01); *G06F 3/1285* (2013.01); *G06F 40/263* (2020.01)

(58) Field of Classification Search
CPC .... G06F 3/1205; G06F 3/1253; G06F 3/1285; G06F 40/263; G06F 3/1229; G06F 3/1238
See application file for complete search history.

(56) References Cited

U.S. PATENT DOCUMENTS

| | | | | |
|---|---|---|---|---|
| 2008/0140388 A1* | 6/2008 | Niimura | ............... | G06F 40/263 704/9 |
| 2014/0035928 A1* | 2/2014 | Ohgake | ................... | G06F 9/454 345/467 |
| 2014/0039874 A1* | 2/2014 | Pelosi | ............... | H04M 1/72436 704/8 |
| 2014/0297254 A1* | 10/2014 | Yeo | ......................... | G06F 40/58 704/2 |
| 2015/0172505 A1* | 6/2015 | Park | ................... | H04N 1/00307 358/1.15 |
| 2018/0225285 A1* | 8/2018 | Anglin | ................... | G06F 40/263 |
| 2018/0276202 A1* | 9/2018 | Baek | ..................... | H04L 51/066 |
| 2019/0294394 A1* | 9/2019 | Oikawa | ................ | G06F 3/1228 |
| 2020/0043495 A1* | 2/2020 | Park | ...................... | G10L 15/005 |
| 2020/0099642 A1* | 3/2020 | Mishima | ............... | G06F 3/1285 |
| 2020/0099799 A1* | 3/2020 | Obayashi | ............. | G06F 3/1204 |
| 2020/0133592 A1* | 4/2020 | Mitsuhashi | ........... | G06F 3/1226 |
| 2020/0213459 A1* | 7/2020 | Miyai | .................. | H04N 1/0097 |
| 2020/0304436 A1* | 9/2020 | Maruyama | .......... | H04L 12/1813 |
| 2020/0304446 A1* | 9/2020 | Sasamae | ................ | H04L 51/02 |
| 2020/0304662 A1* | 9/2020 | Watanabe | .......... | H04N 1/00506 |

FOREIGN PATENT DOCUMENTS

| | | |
|---|---|---|
| JP | 2006-321190 A | 11/2006 |
| JP | 2019-144698 A | 8/2019 |
| JP | 2021117776 A * | 8/2021 |

* cited by examiner

*Primary Examiner* — Helen Zong
(74) *Attorney, Agent, or Firm* — Canon U.S.A., Inc. IP Division

(57) ABSTRACT

A print bot service analyzes a character string received from a message application service and input from a user by using a keyword for each language associated with printing, determines a language used in the character string, and in accordance with the determined language, switches a language used in a message transmitted to the message application service.

13 Claims, 18 Drawing Sheets

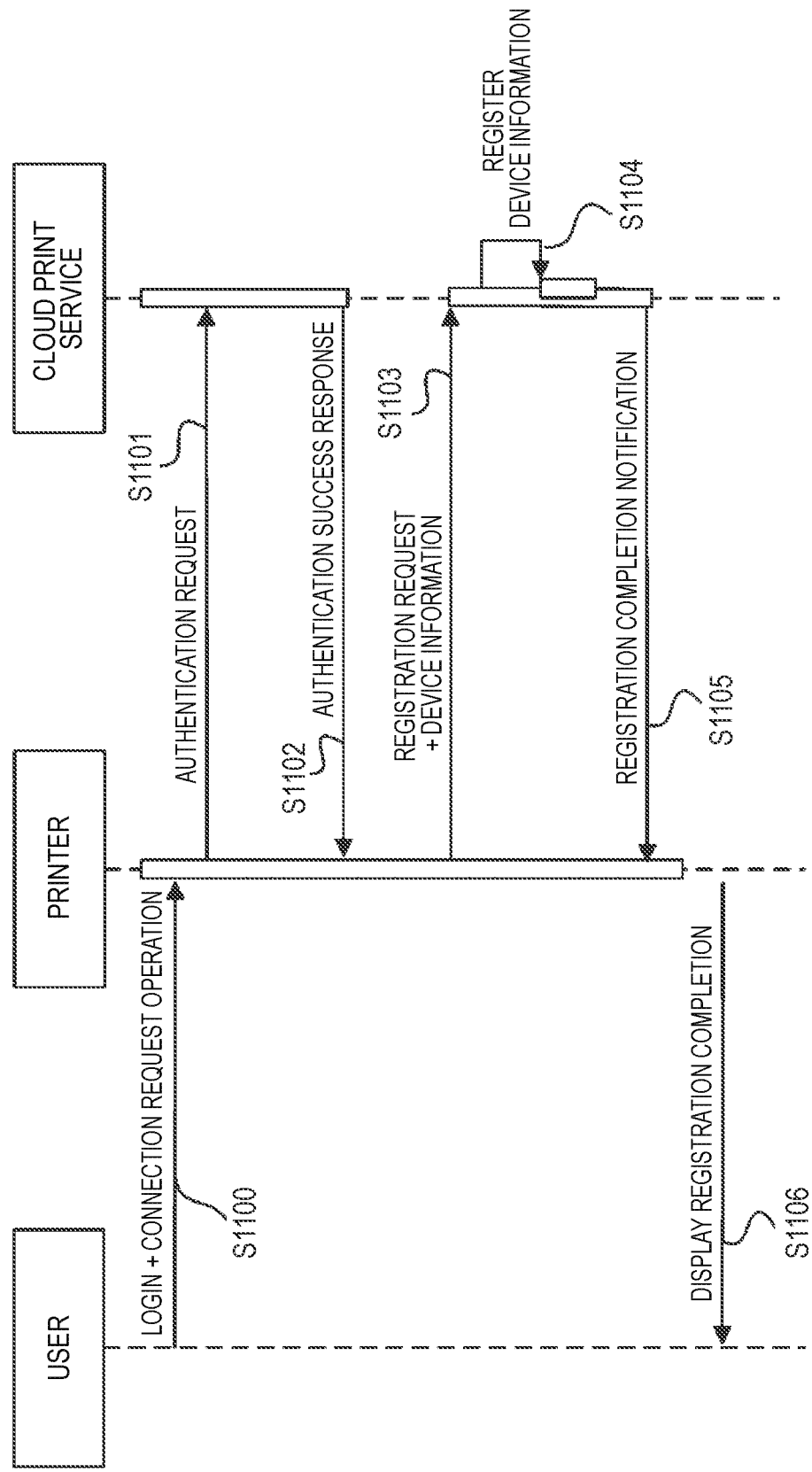

FIG. 11

| APPLICATION ID | USER ID | LANGUAGE SETTING | ACCESS TOKEN | PRINT SETTINGS | PRINTER QUEUE 1 | PRINTER QUEUE 2 | PRINTER QUEUE 3 |
|---|---|---|---|---|---|---|---|
| xyzabc | 0123456 | en | abc | DEFAULT SETTING:<br>- NUMBER OF COPIES: 1<br>- SIMPLEX/DUPLEX SETTING: DUPLEX<br>- COLOR MODE: MONOCHROME<br>2 IN 1 + DUPLEX<br>- NUMBER OF COPIES: 1<br>- SIMPLEX/DUPLEX: DUPLEX<br>- COLOR MODE: COLOR | printer1 | printer2 | printer3 |

| LANGUAGE | PRINT RELATED KEYWORD |
|---|---|
| en | -print<br>-book<br>-copy<br>-impress |
| ja | -印刷<br>-プリント<br>-print<br>-刷る |
| zh-cn | -列印<br>-复制 |
| zh-tw | -列印<br>-复制 |

FIG. 13

| Language | Displayed Character String |
|---|---|
| en | At Start of Printing:<br>"Do you want to print it?"<br>Account Entry Request:<br>"Please enter your ID and Password" |
| ja | At Start of Printing:<br>"印刷しますか?"<br>Account Entry Request:<br>"IDとPasswordを入力してください" |
| zh-cn | At Start of Printing:<br>"您要打印吗？"<br>Account Entry Request:<br>"输入ID和密码" |
| zh-tw | At Start of Printing:<br>"您要打印吗？"<br>Account Entry Request:<br>"输入ID和密码" |

FIG. 14

| Language | Language Specific Character |
|----------|----------------------------|
| en       |                            |
| ja       | - \p{Hiragana}<br>- \p{Katakana} |
| zh-cn    | - 请                        |
| zh-tw    | - 請                        |

FIG. 15A
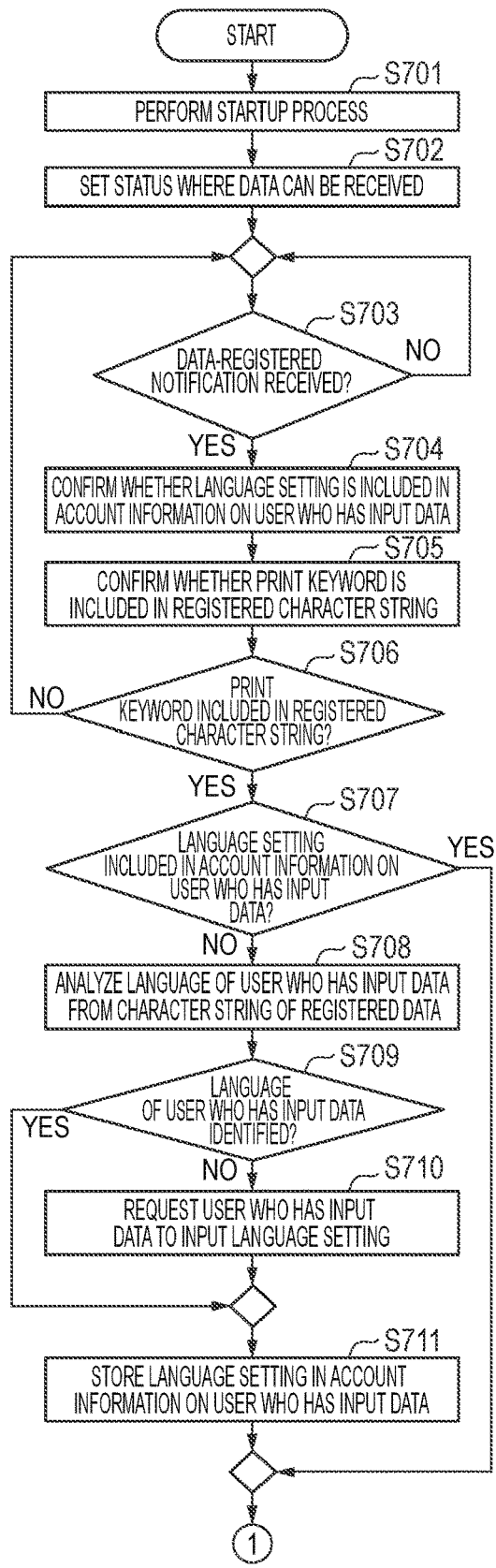
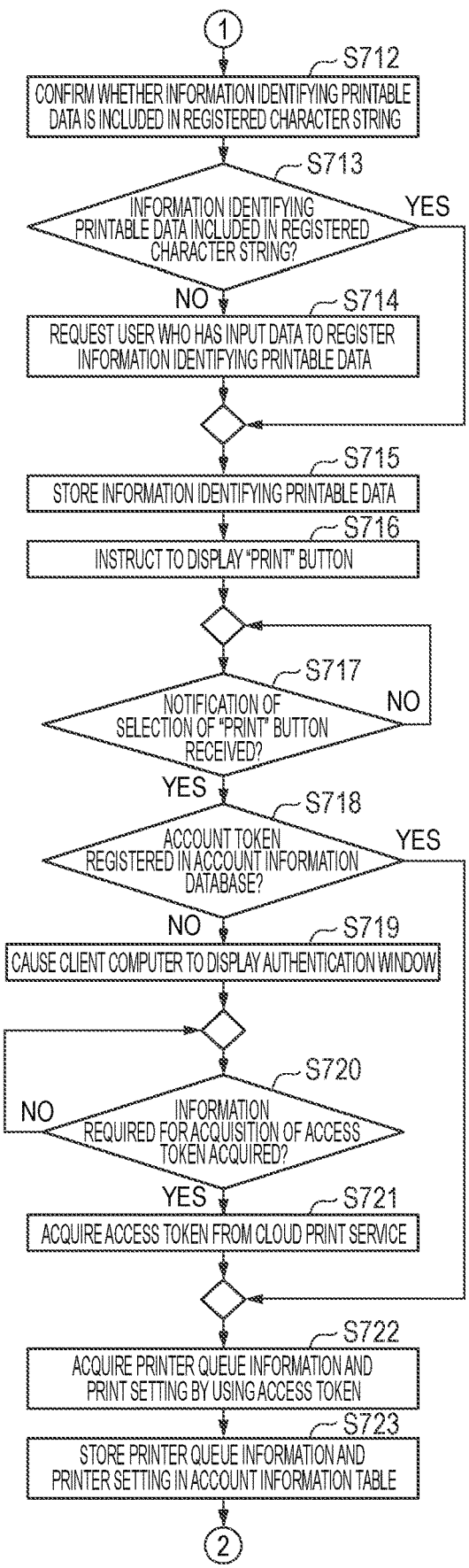

INFORMATION PROCESSING APPARATUS AND INFORMATION PROCESSING METHOD

BACKGROUND

Field of the Disclosure

The present disclosure relates to one or more information processing apparatuses, and the information processing method that can perform cloud printing using a message application service.

Description of the Related Art

With the spread of cloud services, a user can reference and edit data from any client computers by storing data on a cloud service even when the data is not stored in the user's client computer.

There are various services or applications using a cloud service, and users can not only have a conversation with each other in a chat application but also share a text file or image data with each other. Note that a cloud service on which a chat application operates is referred to as "message application service". Among these applications, there also is a service that can cooperate with another cloud service or application and automatically responds to user input (hereinafter, referred to as "bot service"). The bot service is an application that operates on an information processing apparatus that provides an automatic response service. The bot service automatically responds to the input when a word input by the user to the message application service includes a predetermined word, for example.

A message application service is normally used for conversations between users and has no printing function. In a device disclosed in Japanese Patent Application Laid-Open No. 2019-144698, the user registers in advance a bot service having a print setting function as a partner of a conversation in the message application service. When image data is registered in the message application service, the bot service inquires of the user whether or not to print the registered image data. Then, when the user issues a print instruction by using the message application service, printing of image data registered in the message application service is performed by using a printer registered in the bot service. By doing so, even when a message application service has no printing function, it is possible to print data registered in the message application service by using a bot service (hereinafter, referred to as "print bot service").

In a message application service, many and unspecified users may have conversations with each other. In such an environment, it is estimated that a scene where users having different native languages may have a conversation with each other occurs. Japanese Patent Application Laid-Open No. 2006-321190 proposes a printer and a language setting method that convert a language setting used in a printer operation unit into a national language that can be understood by the user in accordance with a print job.

The conventional print bot service that cooperates with a message application service responds in an initially set language even when users having different native languages interact with each other by using a message application service.

SUMMARY

Embodiments of the present disclosure include one or more information processing apparatuses comprising: a reception unit that receives a character string from a message application service; a determination unit that analyzes the character string received from the message application service to determine a language of the character string; a setting unit that, in accordance with the language determined by the determination unit, sets a language to be used for generating a message that enables a user to perform print setting; and a generation unit that generates the message that enables the user to perform print setting and that is to be transmitted to the message application service.

Further features of the present disclosure will become apparent from the following description of exemplary embodiments with reference to the attached drawings.

BRIEF DESCRIPTION OF THE DRAWINGS

FIG. 7 is a sequence diagram illustrating one example of a process for registering a printer to a cloud print service.

FIG. 11 is a diagram illustrating one example of an account information table managed by a database of the print bot service.

FIG. 12 is a diagram illustrating one example of a printing keyword table managed by a database of the print bot service.

FIG. 13 is a diagram illustrating one example of a UI display character string table managed by a database of the print bot service.

FIG. 14 is a diagram illustrating one example pf a language specific character table managed by a database of the print bot service.

FIG. 15A is a flowchart illustrating one example of a process performed by the print bot service.

DESCRIPTION OF THE EMBODIMENTS

Figure 1:
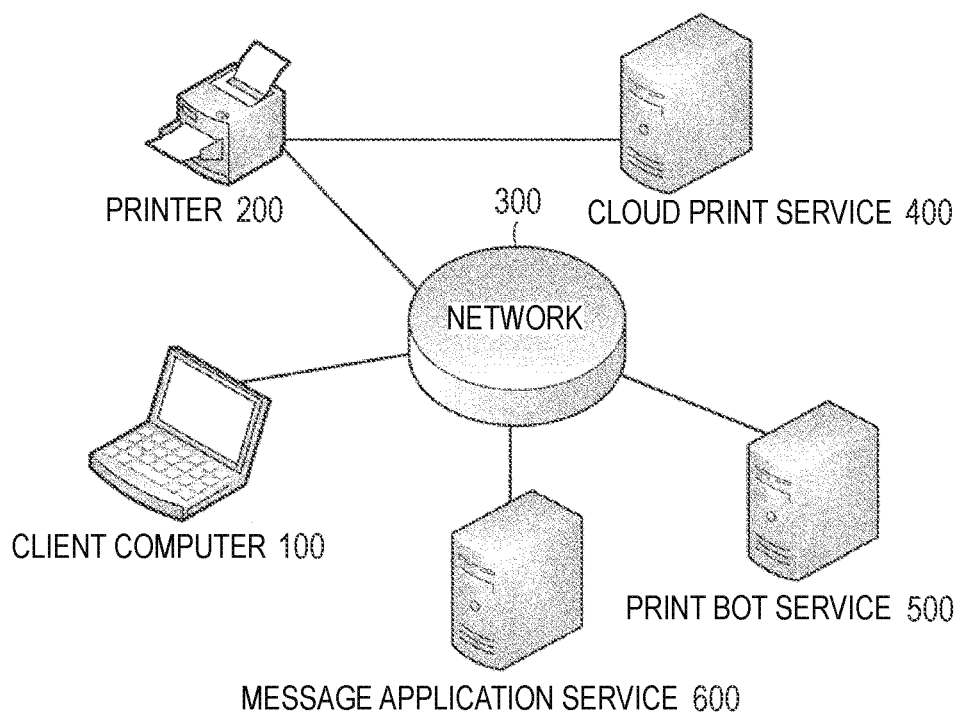
FIG. 1 is a diagram illustrating one example of a general configuration of a system illustrating the present embodiment.

FIG. 1 is a diagram illustrating one example of a general configuration of a system illustrating one embodiment of the present disclosure. In this system, a client computer 100, a printer 200, a cloud print service 400, a print bot service 500, and a message application service 600 are connected to each other so as to be able to communicate with each other via a network 300.

The client computer 100 is a client computer such as a personal computer (PC), a smartphone, or a tablet terminal that is actually operated by a user.

The printer 200 receives print data in a page description language (hereinafter, denoted as "PDL") format from the client computer 100 or the cloud print service 400 and prints the received print data. In the present embodiment, the printer 200 may be a single function printer (SFP) including only a printing function or may be a multi-function printer (MFP) including a printing function, a scanning function, and a copying function.

The cloud print service 400 is formed of one or a plurality of information processing apparatuses and manages text data or image data used for printing. Further, the cloud print service 400 is a server system that performs print setting at printing and generates PDL data, which provides a printing service via a network.

The message application service 600 is a server system formed of one or a plurality of information processing apparatuses that provide functions by which a user operating the client computer 100 transmits and receives a message addressed to another client computer (not illustrated). In the present embodiment, the user transmits and receives text data or image data by using the message application service 600. The message application service 600 further transmits text data or image data to be printed to the print bot service 500.

The print bot service 500 is a server system formed of one or a plurality of information processing apparatuses. The print bot service 500 is a server system that receives print data including text data or image data from the message application service 600 and then provides print data to the cloud print service 400. In cooperation with the message application service 600 and the print bot service 500, it is possible to print text data or image data registered in the message application service 600 even when a message application service has no printing function.

The network 300 may be the Internet, may be an intranet, or may be a combination thereof. In the present embodiment, each of the cloud print service 400, the print bot service 500, and the message application service 600 will be described as a server system extended on a cloud service formed of one or a plurality of server apparatuses. However, some or all of the cloud print service 400, the print bot service 500, and the message application service 600 may be an on-premise system.

Figure 2:
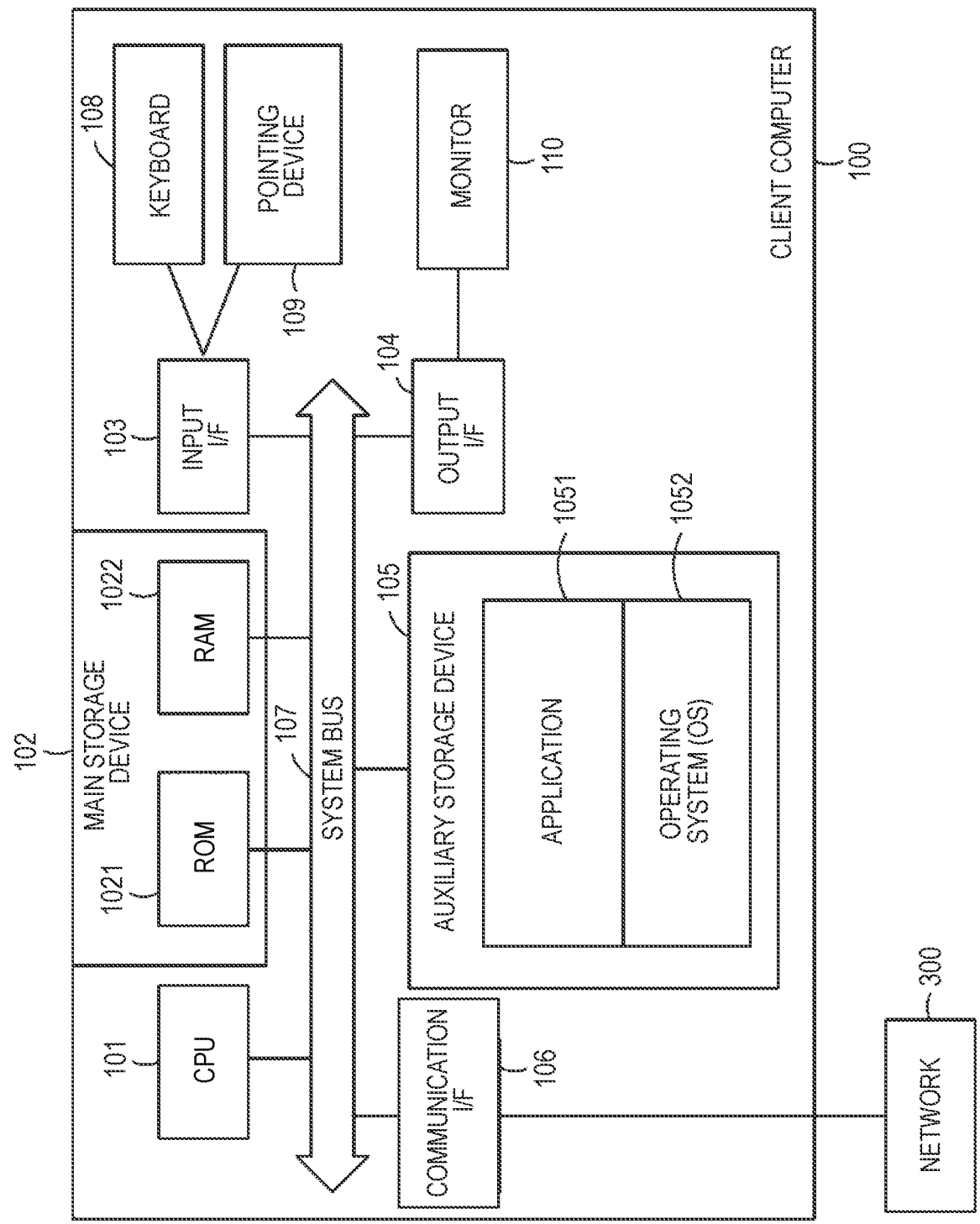
FIG. 2 is a diagram of a hardware configuration of a client computer.

FIG. 2 is a block diagram illustrating one example of a hardware configuration of the client computer 100. A CPU 101 controls the overall apparatus in accordance with a program stored in a ROM 1021, a RAM 1022, or an auxiliary storage device 105. A main storage device 102 includes the ROM 1021 and the RAM 1022. The ROM 1021 stores a program executed by the CPU 101 or data. The RAM 1022 is also used as a work area when the CPU 101 performs various processes. The auxiliary storage device 105 stores an application (hereinafter, also denoted as "App") 1051, an operating system (hereinafter, denoted as "OS") 1052, other data, or the like.

An input interface (I/F) 103 is an interface that accepts input from the external devices and is connected to an input device such as a keyboard 108 or a pointing device 109 represented by a mouse, a touch panel, or the like. An input device such as the keyboard 108, a mouse, a touch panel, or the like is a device used by the user to output various instructions to a computer through the input I/F 103. An output I/F 104 is an interface used for externally outputting data and outputs data to an output device such as a monitor 110.

The client computer 100 is connected to the printer 200, the message application service 600, and the cloud print service 400 via the network 300 connected through a communication I/F 106. A system bus 107 is a common data system bus and is used for transferring respective data between hardware modules forming the client computer 100.

Figure 3:
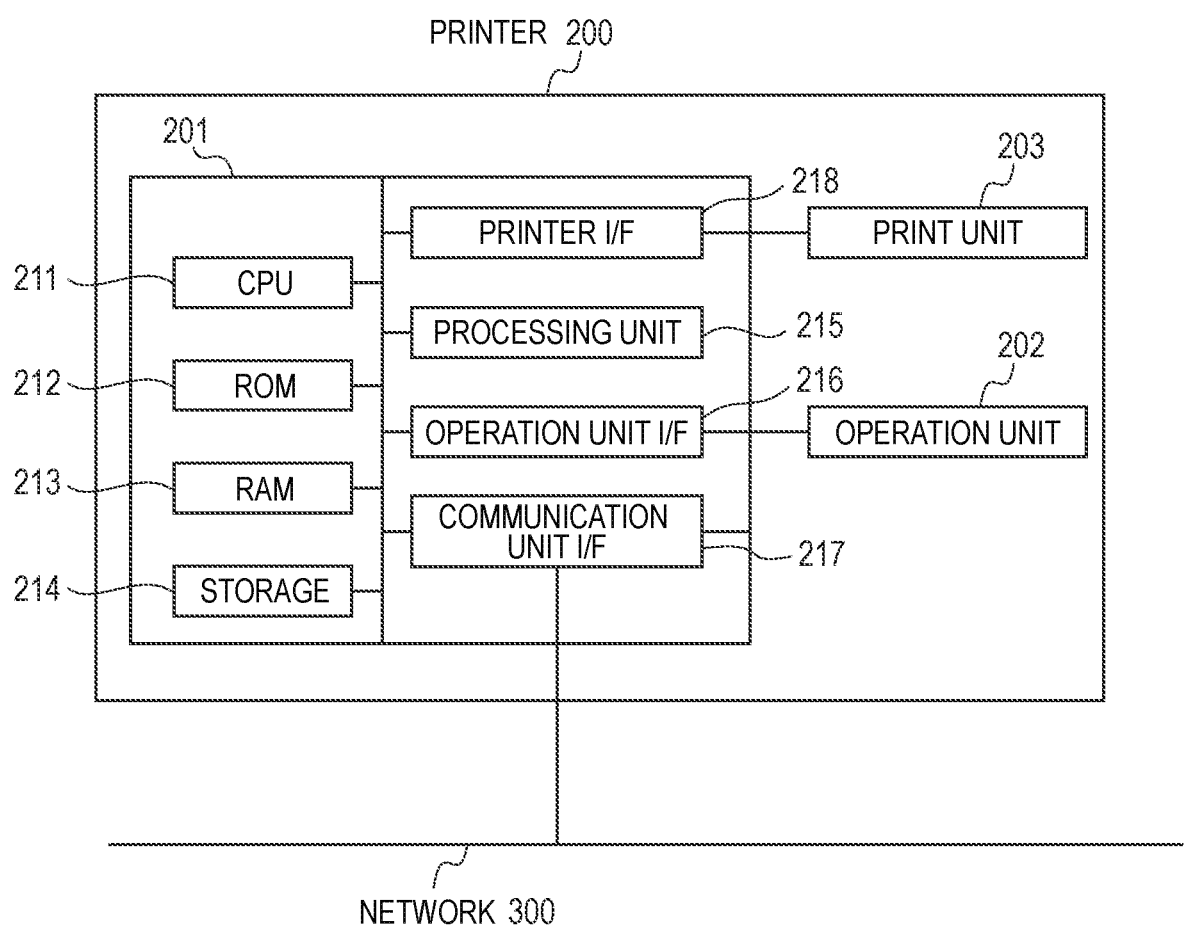
FIG. 3 is a diagram of a hardware configuration of a printer.

FIG. 3 is a block diagram illustrating one example of a configuration of the printer 200. A control unit 201 including a CPU 211 controls the overall operation of the printer 200. The CPU 211 performs various control such as print control or read control by reading a control program stored in a ROM 212 or a storage 214. The ROM 212 stores a control program or data that can be executed by the CPU 211. A RAM 213 is a main storage memory for the CPU 211 and is used as a work area or a temporary storage region for loading various control programs. The storage 214 stores print data, image data, various programs, and various setting information.

While it is assumed that an auxiliary storage device such as a hard disk drive (HDD) is used as the storage 214 in the present embodiment, a nonvolatile memory such as a solid state drive (SSD) or the like may be used instead of or together with an HDD. As described above, hardware components such as the CPU 211, the ROM 212, and the RAM 213 form a so-called computer.

A processing unit 215 has a function of a raster image processor (RIP) that loads print data received via a network to generate a print image. Further, the processing unit 215 has an ability of an image processing unit and can perform image resolution conversion or image correction processing. Note that, while it is assumed that the processing unit 215 is implemented by a hardware circuit (ASIC, EPGA, or the like) in the present embodiment, the embodiment is not limited thereto. For example, the printer 200 may have a processor dedicated to a use of image processing, and the processor dedicated to a use of image processing may execute an image processing program to implement image processing or load processing of print data. Moreover, the CPU 211 may execute a program used for performing image processing and perform image processing or load processing of print data. Further, image processing may be performed by any combination of the above.

An operation unit I/F 216 is an interface that connects an operation unit 202 and the control unit 201 to each other. The operation unit 202 is provided with a liquid crystal display unit having a touch panel function, various hard keys, or the like and functions as a display unit that displays information or an accepting unit that accepts an instruction from a user.

A printer I/F 218 is an interface that connects a print unit 203 and the control unit 201 to each other. A print image generated through analysis of print data performed by the processing unit 215 is transferred from the control unit 201 to the print unit 203 via the printer I/F 218. The print unit 203 receives a control command and a print image via the control unit 201 and prints the image on a sheet fed from a paper feeding cassette (not illustrated) based on the image.

Further, the control unit 201 is connected to the network 300 via a communication unit I/F 217. The communication unit I/F 217 transmits an image or information to a communication device on the network 300 and receives print data or information from a communication device on the network 300.

While the printer 200 is an SFP having only a printing function in the present embodiment, the printer 200 has a reading unit and may be an MFP having a copying function or a scanning function. In such a case, image data generated by reading a document by the reading unit is stored in the storage 214.

Figure 4:
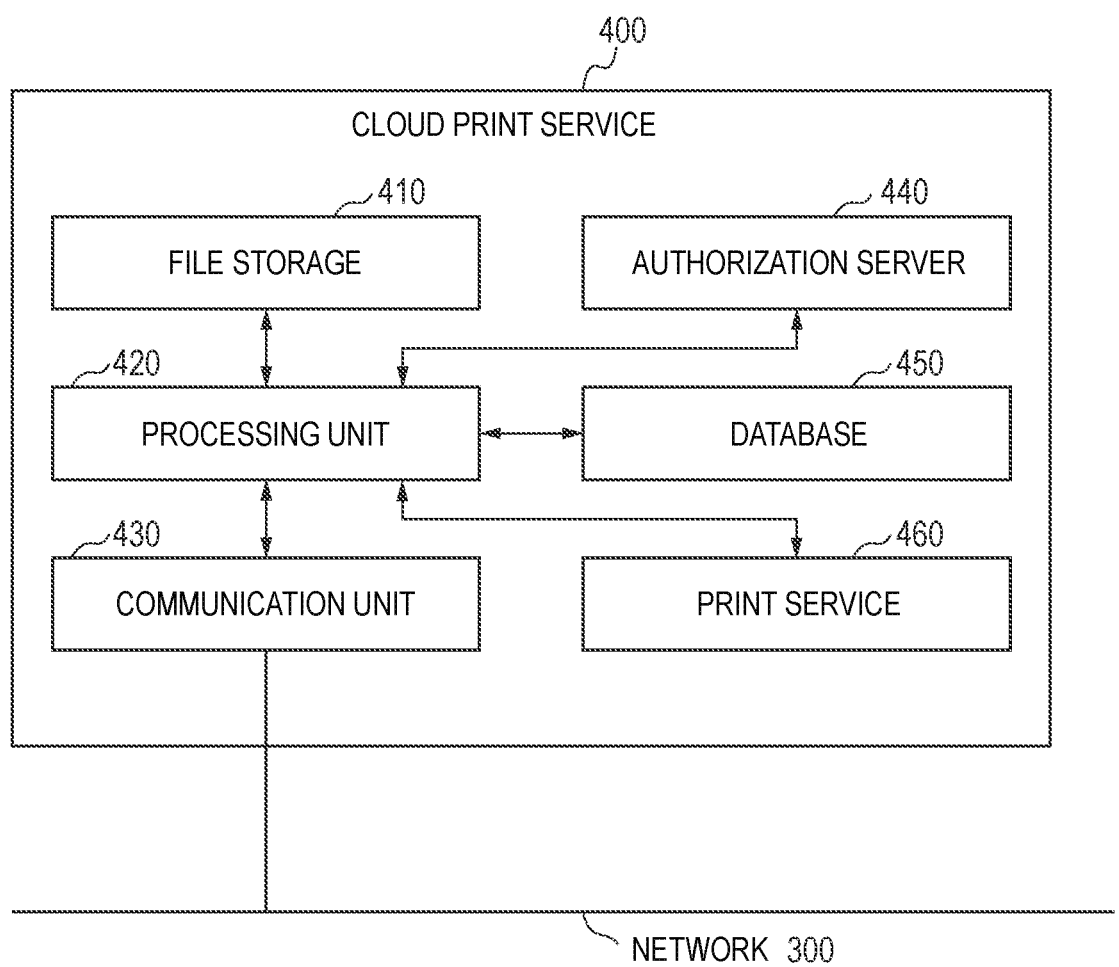
FIG. 4 is a diagram of a software module configuration of a cloud print service.

FIG. 4 is a block diagram illustrating a function module of the cloud print service 400. The cloud print service 400 is a server system formed of one or a plurality of information processing apparatuses having the same configuration as the client computer illustrated in FIG. 2. The function module illustrated in FIG. 4 is implemented when one or more CPUs of one or a plurality of information processing apparatuses forming the cloud print service 400 execute a program stored in an auxiliary storage device or the like.

Note that a cloud print service in the embodiment is a service that transmits print data via the network 300 to a printer registered in the cloud print service 400 based on an externally received print instruction and performs printing.

The cloud print service 400 has a file storage 410, a processing unit 420, a communication unit 430, an authorization server 440, a database 450, and a print service 460.

The file storage 410 stores a print job transmitted to a printer via the communication unit 430. The authorization server 440 has an authentication module used for performing an authentication process on the user who accesses the cloud print service 400. The authorization server 440 further manages authentication information required for accessing account information stored in the database 450.

The database 450 holds user account information and stores a printer queue or a print setting associated with the user, a language setting, printer device information, or the like. A print service module related to reflecting of a print setting or rendering is included in the print service 460. The processing unit 420 controls each module in the authorization server 440 or the print service 460 and controls each module processing.

Figure 5:
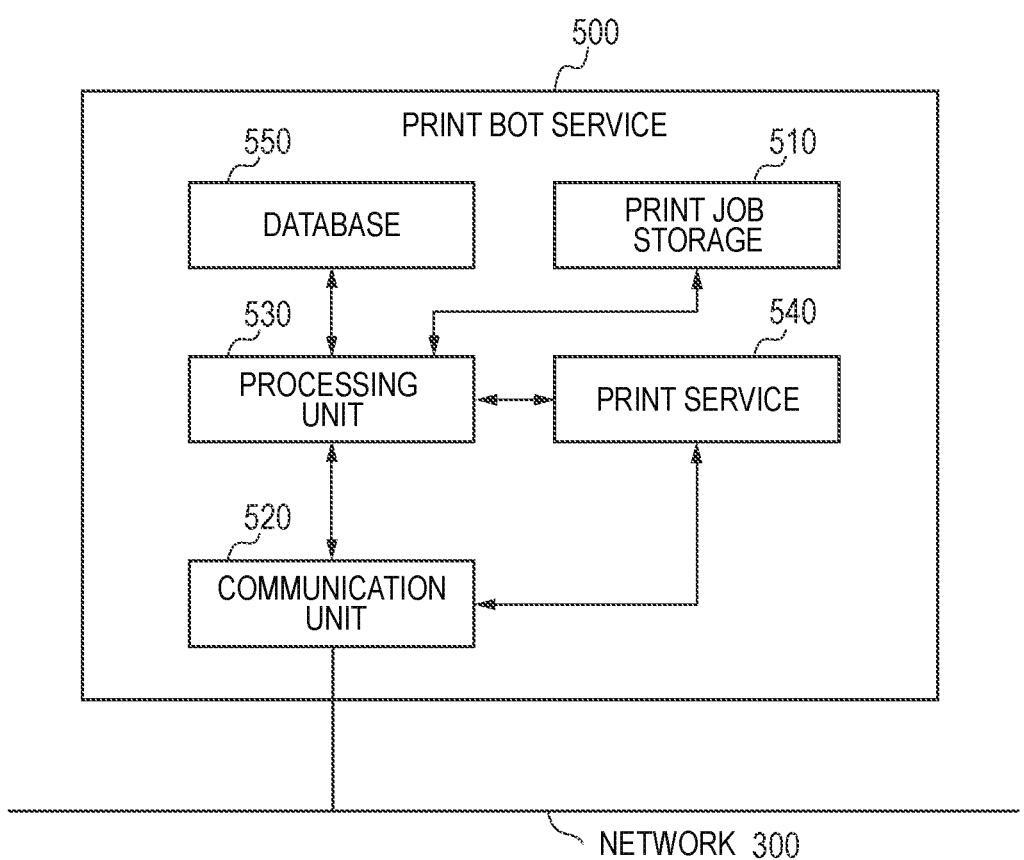
FIG. 5 is a diagram of a software module configuration of a print bot service.

FIG. 5 is a block diagram illustrating a function module of the print bot service 500. The print bot service 500 is a server system formed of one or a plurality of information processing apparatuses having the same configuration as the client computer illustrated in FIG. 2. The function module illustrated in FIG. 5 is implemented when one or more CPUs of one or a plurality of information processing apparatuses forming the print bot service 500 execute a program stored in an auxiliary storage device or the like.

The print bot service 500 receives an instruction from the message application service 600, returns a result of the instruction to the message application service 600, and causes the client computer 100 to display the result.

The print bot service 500 has a print job storage 510, a processing unit 530, a communication unit 520, a database 550, and a print service 540.

The print job storage 510 is a storage module used for storing image data or text data that is a print target input via the message application service 600. The communication unit 520 is a communication module used for communicating with another apparatus or service via the network 300. The processing unit 530 is a module used for processing data transmitted from a client computer or transmitting a job to a cloud print service.

The print service 540 is a module group related to printing, which holds a change of a print setting and associates a print job with a print setting. The print setting changed by the print service 540 is actually reflected to a job in the print service 460 of FIG. 4. The database 550 stores user data required for managing a job and holding authentication information or table information used for automatic processing determination or automatic setting change. The print bot service 500 includes the above function group.

Figure 6:
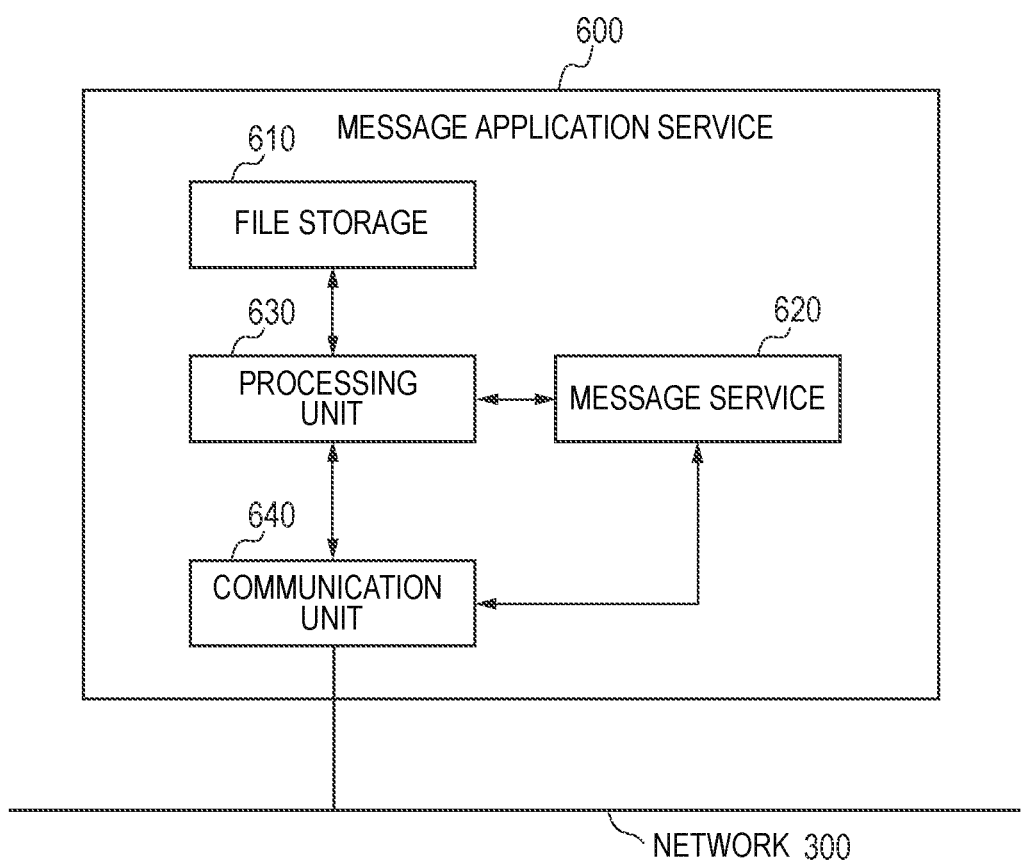
FIG. 6 is a diagram of a software module configuration of a message application service.

FIG. 6 is a block diagram illustrating a function module of the message application service 600. The message application service 600 is a server system formed of one or a plurality of information processing apparatuses having the same configuration as the client computer illustrated in FIG. 2. The function module illustrated in FIG. 6 is implemented when one or more CPUs of one or a plurality of information processing apparatuses forming the message application service 600 execute a program stored in an auxiliary storage device or the like.

The message application service 600 has a file storage 610, a message service 620, a processing unit 630, and a communication unit 640. When the user operates the message application service 600 via a web browser of the client computer 100, a message or data is thereby registered in the message application service 600. In the present embodiment, a client application of the message application service 600 will be illustrated as an application that operates on a web browser. However, the client application of the message application service 600 may be an application installed in the client computer 100.

The file storage 610 is a module that stores text data or image data input from a client application by the user. Text data and image data printed by the cloud print service 400 are transmitted from a client computer and stored in the file storage 610.

The message service 620 transmits data to the communication unit 520 of the print bot service 500 via the communication unit 640 and the network 300 and stores the received data in the file storage 610. Further, the message service 620 displays a message on the web browser of the client computer 100 based on a request from the print bot service 500. Further, the message service 620 transmits data stored in the file storage 610 to the print bot service 500 based on a print instruction from the user. An account for the print bot service 500 is registered in the message service 620. When an event (posting of a message or registration of image data to a chat room, for example) registered in advance occurs, the message service 620 in which an account for the print bot service 500 is registered notifies the print bot service 500 of the event. Note that, although illustration is omitted in FIG. 1, when the message application service 600 transfers a message between a plurality of client computers, a process such as relay of the message may be performed.

Herein, in the present embodiment, the method of registering the printer 200 to the cloud print service 400 will be described with reference to FIG. 7. FIG. 7 is a sequence diagram illustrating one example of a process of registering the printer 200 to the cloud print service 400. Note that the sequence illustrated in FIG. 7 is one example of the method of registering a printer to a cloud print service, and a printer may be registered to the cloud print service 400 by using another method. Further, a process performed by the printer 200 illustrated in the sequence diagram is implemented when the CPU 211 of the printer 200 executes a program stored in the ROM 212 or the like. Further, the process performed by the cloud print service 400 is implemented when one or more CPUs of one or a plurality of computers execute a program stored in at least any of one or a plurality of computers forming the cloud print service 400.

First, the user logs in the printer 200 from the operation unit 202 of the printer 200 and provides an instruction to access the cloud print service 400 (S1100). This is an operation performed by the user, and the printer 200 accepts the operation. The access to the cloud print service 400 is performed when the user selects a predetermined icon displayed on the operation unit 202 of the printer 200, for example. The printer 200 has a web browser function, and when the user selects a predetermined icon, the printer 200 accepts the operation and accesses a URL of the cloud print service 400 set in advance. The printer 200 displays a window used for inputting information required for authentication to log in the cloud print service 400 from the user on the operation unit 202 of the printer 200. The user enters a user name and a password required for logging in the cloud print service 400 from the operation unit 202.

The printer 200 accepts an authentication request to the cloud print service 400 from the user and transmits the authentication request to the cloud print service 400 by using the input user name and password input in S1100 described above (S1101). The cloud print service 400 receives a user name and a password transmitted from a printer and performs user authentication at the authorization server 440. If the authentication is successful, the cloud print service 400 notifies the printer 200 of a connection successful response (S1102).

In response to receiving the connection successful response from the cloud print service 400, the printer 200 transmits, to the cloud print service 400, a registration request and printer information to order to register the printer 200 in the cloud print service 400 (S1103). In the present embodiment, a printer UUID or SSID as printer information and device information such as a printer name that can individually identify a device are transmitted.

In response to receiving the registration request and the device information from the printer 200, the cloud print service 400 registers identification information used for identifying a logged-in user and the received device information to the database 450 in association with each other (S1104). Moreover, the cloud print service 400 transmits a registration completion notification to the printer 200 (S1105). The printer 200 receives the registration completion notification from the cloud print service 400 and displays the registration completion notification on the operation unit 202 (S1106). This display enables the user to confirm that the printer 200 is registered in the cloud print service 400.

By the processes described above, a table in which identification information that identifies a user is associated with device information on a printer that can be used by the user is generated in the database 450 of the cloud print service 400. By performing the process illustrated in FIG. 7 in the respective printers, it is possible to associate multiple pieces of device information with one piece of identification information (one user).

Figure 8A:
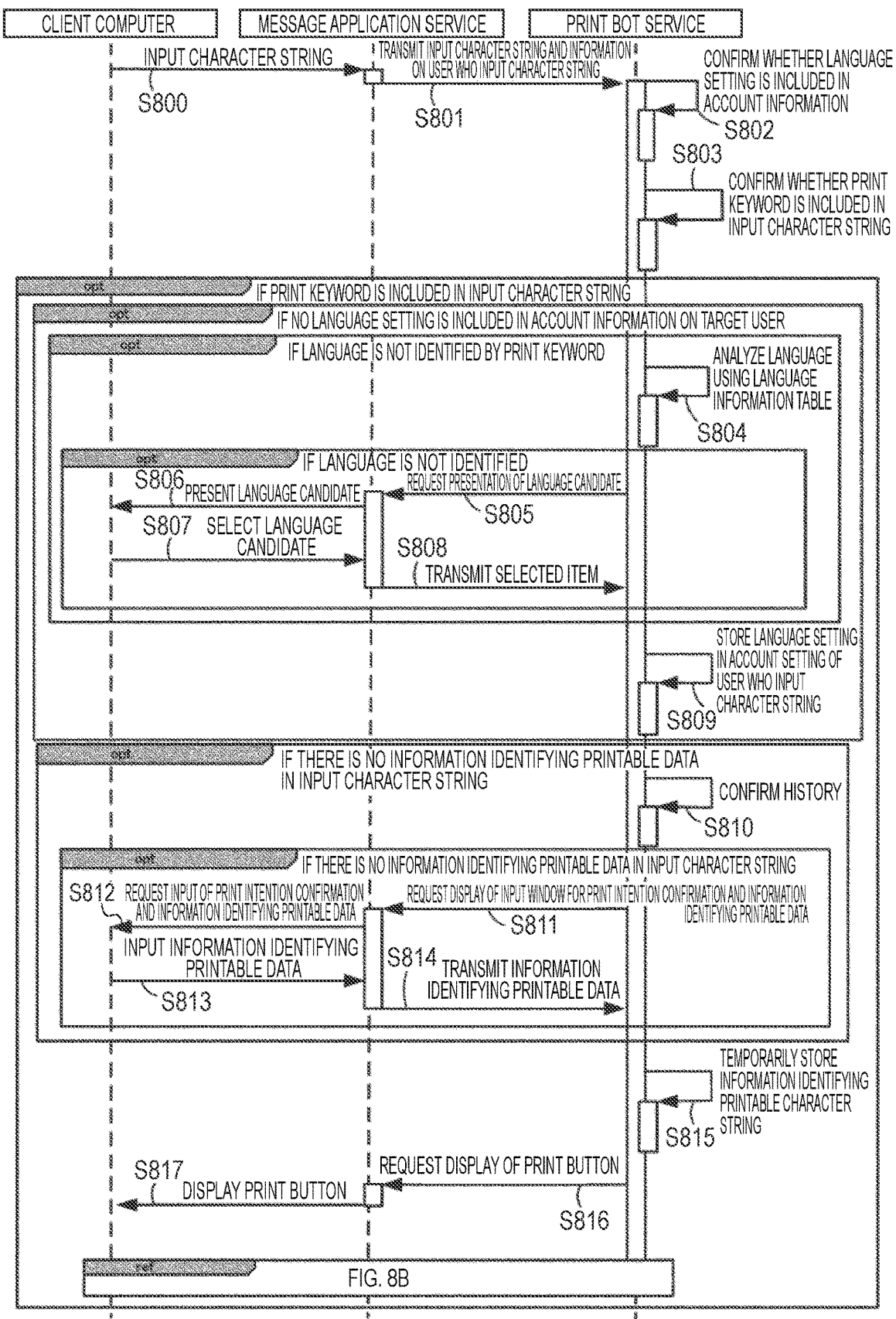
FIG. 8A is a sequence diagram illustrating one example of a process for printing using a printing system.
Figure 8B:
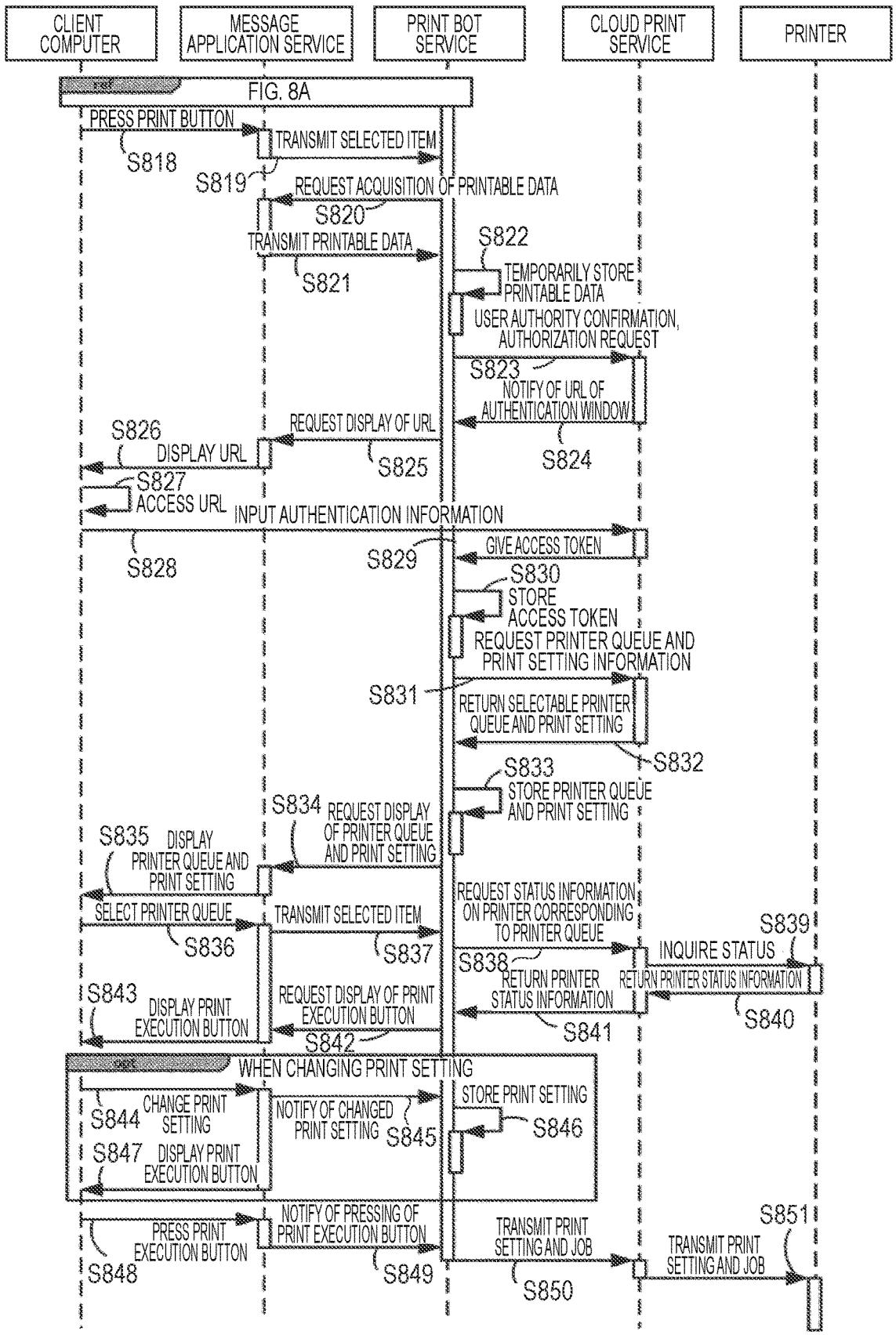
FIG. 8B is a sequence diagram illustrating one example of a process for printing using the printing system.
Figure 9A:
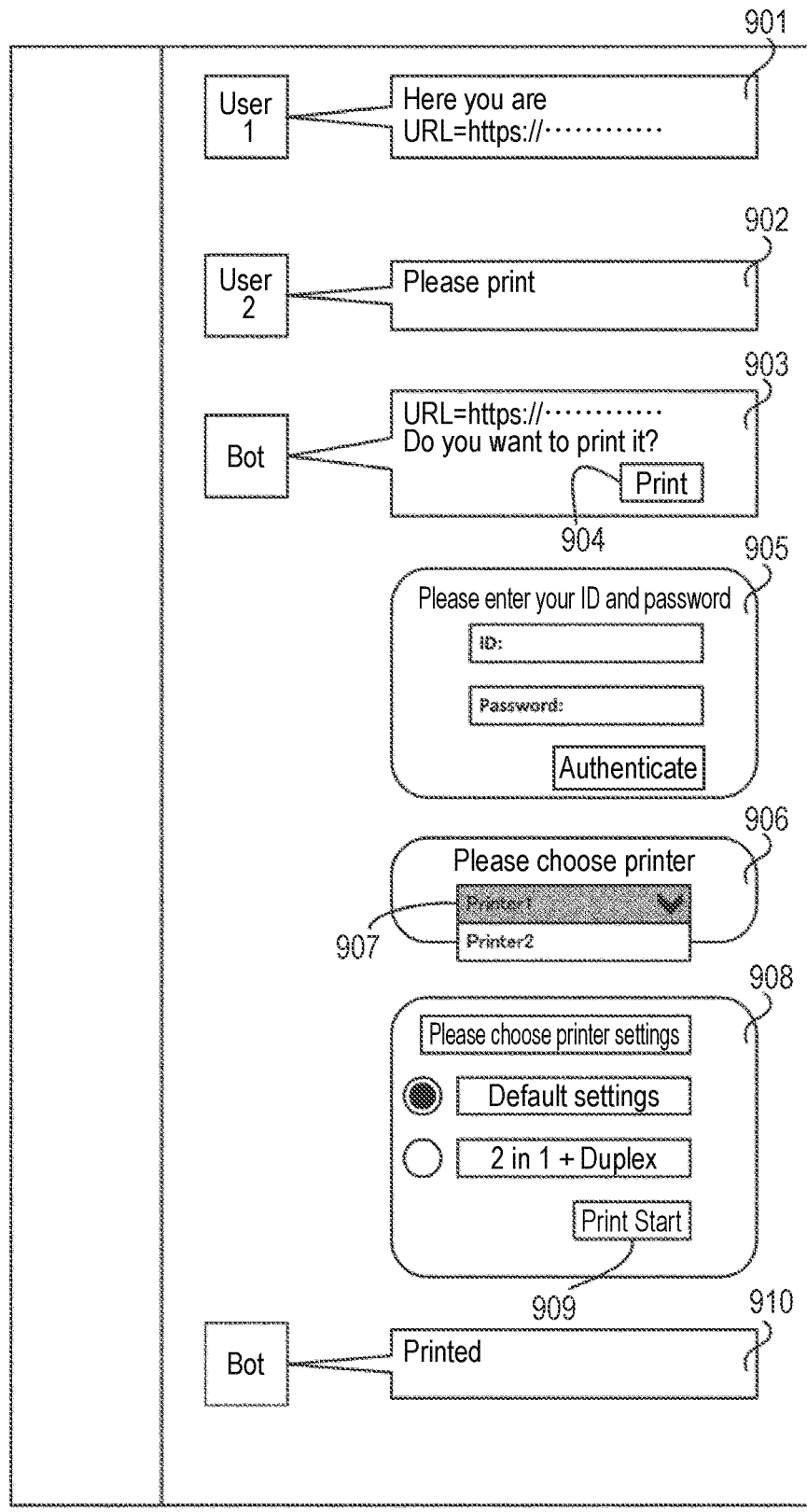
FIG. 9A is a diagram illustrating one example of a screen displayed on a client computer by a message application.
Figure 9B:
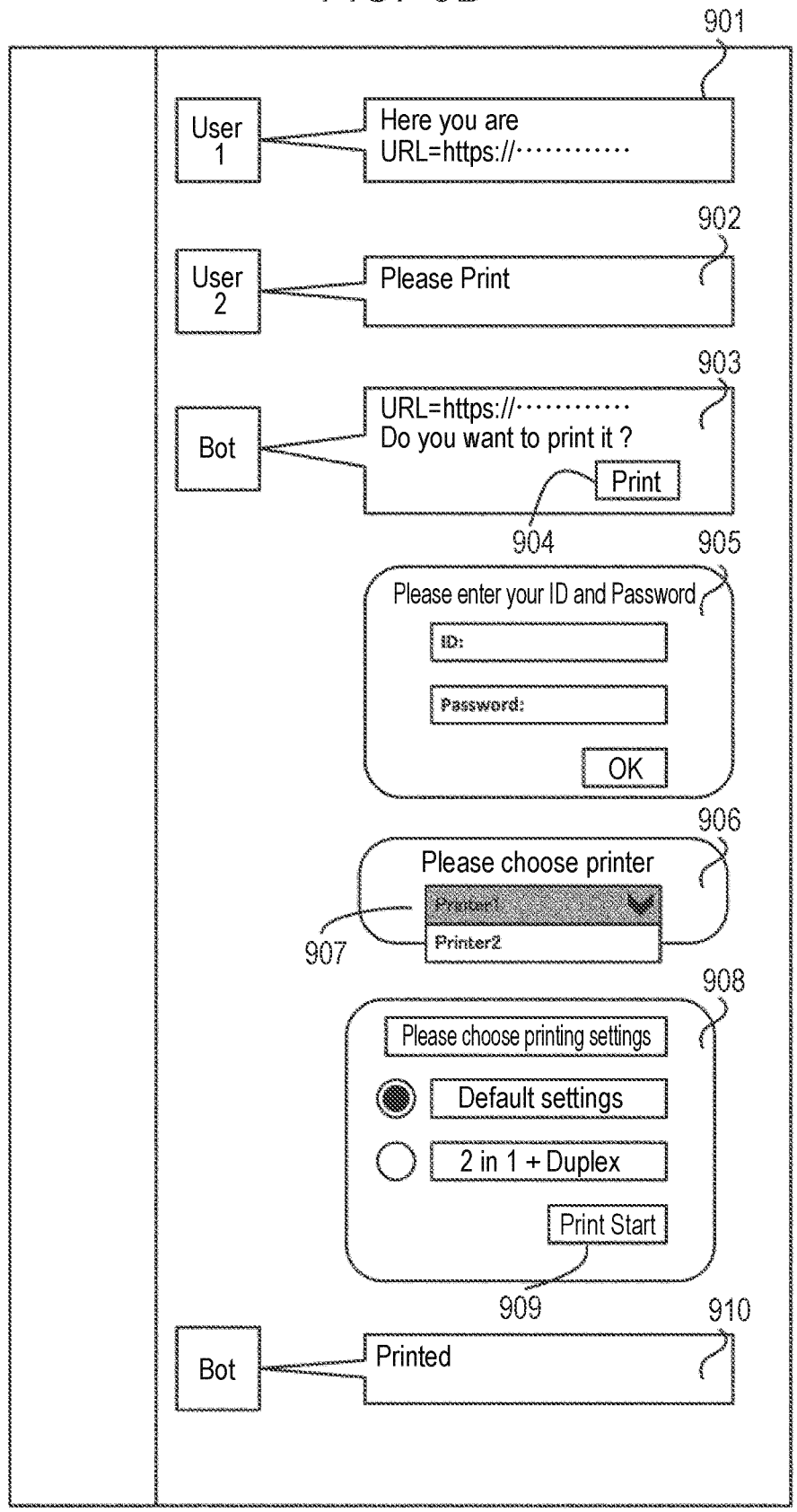
FIG. 9B is a diagram illustrating one example of a screen displayed on a client computer by the message application.

Next, the scheme of performing printing by using a printer registered in the cloud print service 400 will be described with reference to FIG. 8A and FIG. 8B, and a screen in which the message application service 600 and the user interact with each other will be described with reference to FIG. 9A and FIG. 9B and FIG. 10. FIG. 8A and FIG. 8B are sequence diagrams illustrating one example of a process of performing printing by using a printer registered in the cloud print service 400. Note that the process performed by the client computer 100 illustrated in the sequence diagrams is implemented when the CPU 101 of the client computer 100 executes a program stored in the auxiliary storage device 105 or the like. Further, the process performed by the message application service 600 is implemented when one or more CPUs of one or a plurality of computers execute a program stored in at least any of the one or a plurality of computers forming the message application service 600. Further, the process performed by the print bot service 500 is implemented when one or more CPUs of one or a plurality of computers execute a program stored in at least any of the one or a plurality of computers forming the print bot service 500. Further, the process performed by the cloud print service 400 is implemented when one or more CPUs of one or a plurality of computers execute a program stored in at least any of the one or a plurality of computers forming the cloud print service 400. Note that FIG. 8A and FIG. 8B will be collectively referred to as FIG. 8 below.

In the sequence of FIG. 8, at least, an account for the print bot service 500 is registered in the message application service 600 in advance, and a chat room to which the user and the print bot service 500 join is generated in the message application service 600. In the message application service 600, an address used for accessing the print bot service 500 is registered in advance. In the print bot service 500, addresses used for accessing the message application service 600 and the cloud print service 400 are registered in advance.

The user inputs characters from the client computer 100 to a chat room to which the print bot service 500 of the message application service 600 joins. In response to this operation, the client computer 100 transmits the characters input by the user to the chat room to which the print bot service 500 of the message application service 600 joins (S800). When the characters are transmitted to the message application service 600, characters input as a chat boxes 901 and 902 of FIG. 9A and FIG. 9B and a chat box 1000 of FIG. 10 are displayed on a chat room displayed on the monitor 110 of the client computer 100. FIG. 9A, FIG. 9B, and FIG. 10 are diagrams illustrating one example of a screen displayed on the client computer 100 by the message application service 600. Note that FIG. 9A and FIG. 9B will be collectively referred to as FIG. 9 below.

If a character string is input in a chat room to which the above print bot service 500 joins, the message application service 600 transmits, to the print bot service 500, the input character string and information on a user who has input the character string (S801). In details, in S801, the message service 620 of the message application service 600 in which an account for the print bot service 500 is registered detects that data is input on the chat room and notifies the print bot service 500 of an event. Hereinafter, the operation of "the message service 620 of the message application service 600 in which an account for the print bot service 500 is registered" will be simply described as an operation performed by "the message application service 600" as the subject.

The print bot service 500 confirms whether or not a language is set in a language setting 1204 in account information (stored in an account information table 1201 illustrated in FIG. 11 described later) associated with the user who has input the character string (S802). FIG. 11 is a diagram illustrating one example of the account information table 1201 managed by the database 550 of the print bot service 500. The account information table 1201 holds, as account information for each user, an application ID 1202, a user ID 1203, the language setting 1204, an access token 1205, a print setting 1206, and a printer queue 1207 in association with each other.

Further, by using a print keyword table 1301 illustrated in FIG. 12, the print bot service 500 confirms whether or not a print keyword is included in the character string received from the message application service 600 (S803). FIG. 12 is a diagram illustrating one example of the print keyword table 1301 managed by the database 550 of the print bot service 500. The print keyword table 1301 holds language information 1302 and print related keyword information 1303 in association with each other. The language information 1302 may be held at a main language level or may be held at a sublanguage level of a dialect or the like such as classifications of Chinese (simplified Chinese character) 1304 of the People's Republic of China or Chinese (traditional Chinese character) 1305 of Taiwan.

The following description will be provided based on the assumption that a character string that matches any of keywords held in the print related keyword information 1303 is included in the character string input in S800 described above. Note that, in the process of S803, if it is confirmed that no print related keyword is included in a character string received from the message application service 600, the print bot service 500 does not operate.

If a language is not set in the language setting 1204 in the account information table 1201 associated with the user who has inputs the character string in S800 described above, the print bot service 500 performs the process of S804 to S809. In S804 to S809, the print bot service 500 determines a language used by the user and stores the language setting 1204 in the account information table 1201. While details will be described later, a character string presented to the user by the print bot service 500 is a character string searched from the UI display character string table 1401 illustrated in FIG. 13 by using the language setting 1204 of a user who is a present target.

FIG. 13 is a diagram illustrating one example of the UI display character string table 1401 managed by the database 550 of the print bot service 500. For example, a window presented to the user by the print bot service 500 is as illustrated in FIG. 9A when the language setting 1204 of the user is Japanese (ja), and a window presented to the user by the print bot service 500 is as illustrated FIG. 9B when the language setting 1204 of the user is English (en).

Turning back to the description of FIG. 8 below, if the same print keyword as the print keyword confirmed in the process of S803 described above is associated with multiple pieces of language information 1302, an input language of the user is not uniquely identified. In such a case, the print bot service 500 confirms whether or not a language specific character is included in the character string received from the message application service 600 by using a language specific character table 1501 illustrated in FIG. 14 (S804).

Figure 14:
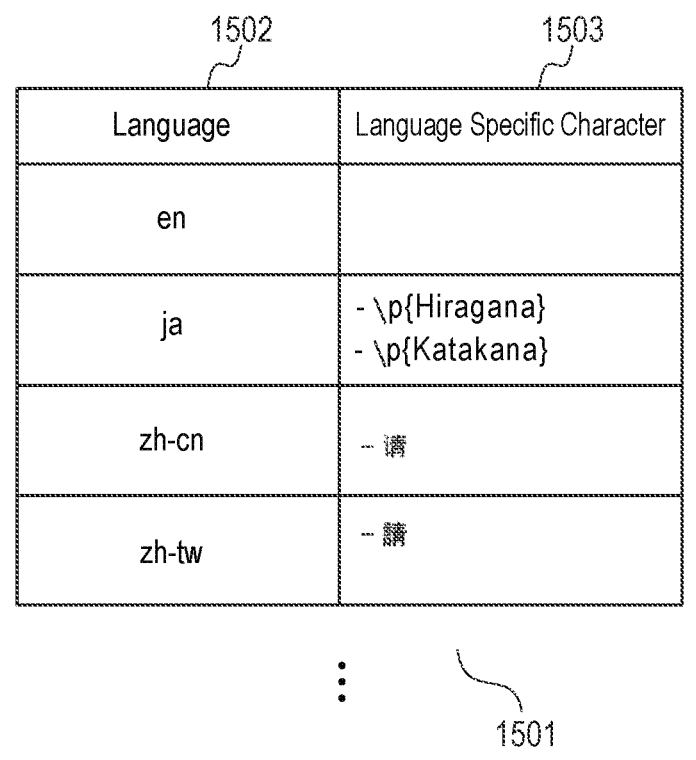

FIG. 14 is a diagram illustrating one example of the language specific character table 1501 managed by the database 550 of the print bot service 500. The language specific character table 1501 holds language information 1502 and a language specific character 1503 in association with each other. The language specific character 1503 holds a character not included in other languages, may directly hold a specific character, or may hold characters such as hiragana or katakana in Japanese in a regular expression.

Figure 10:
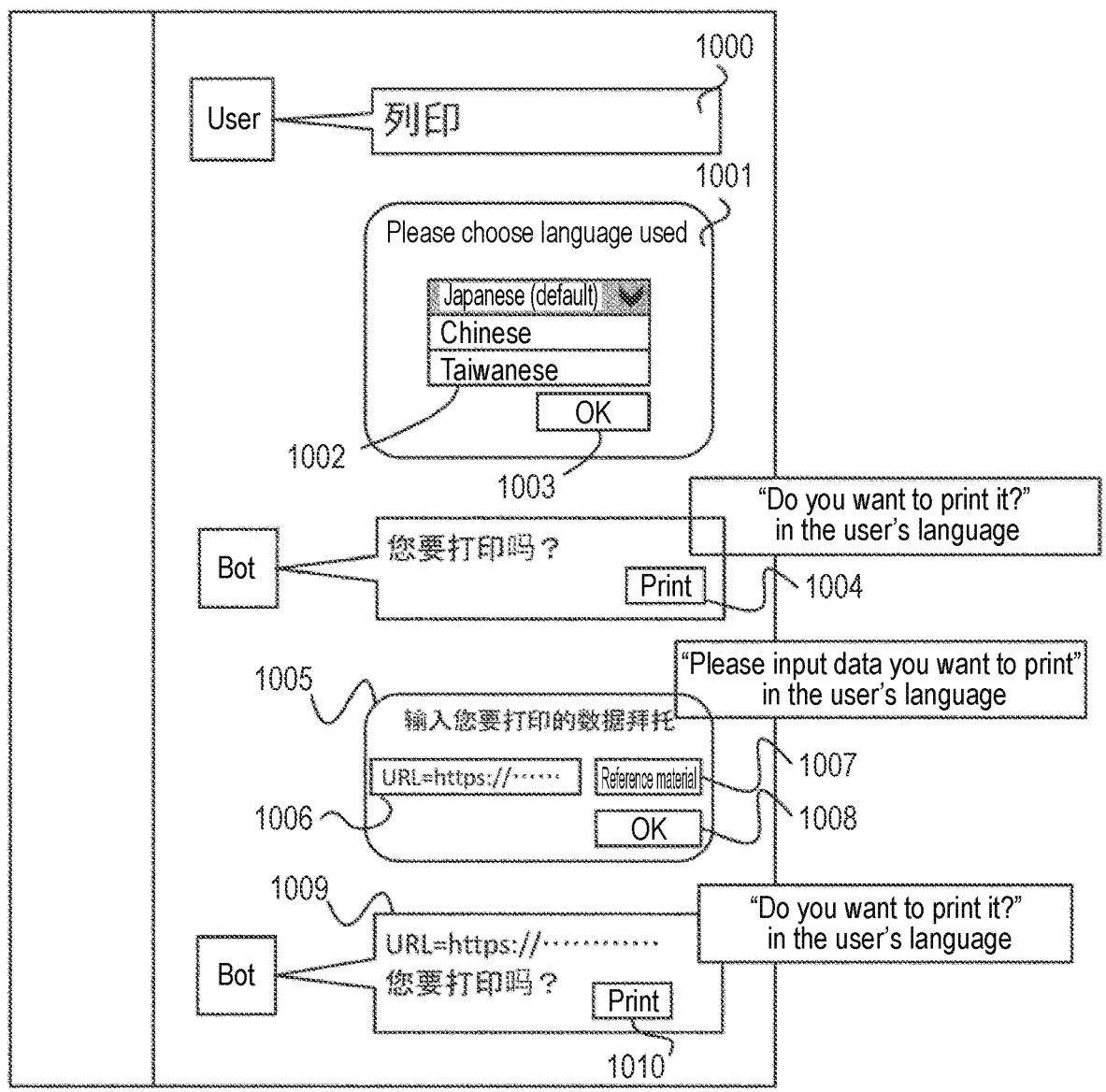
FIG. 10 is a diagram illustrating one example of a screen displayed on a client computer by the message application.

In the process of S804 described above, if no language specific character is included and the language is not identified, the print bot service 500 presents language candidates as illustrated in a window 1001 of FIG. 10 and prompts the user to select a language (S805 to S808). In details, in S805, the print bot service 500 transmits, to the message application service 600, a request for display that requests selection of a language by presenting language candidates in a default language. This request for display is a message described in a JSON format or an XML format, for example. In the example of the window 1001 of FIG. 10, choices that prompt the user to select a language to be used and an OK button correspond to the message described in the JSON format.

In response to the request for display that requests selection of a language described above, the message application service 600 displays, on the chat room described above, display that requests selection of a language by presenting language candidates (S806). Accordingly, display that requests selection of a language by presenting language candidates as with the window 1001 of FIG. 10 is displayed on the chat room displayed on the monitor 110 of the client computer 100.

Then, if the user selects a language candidate, the client computer 100 transmits the selected language candidate and information on the user who has input the character string to the message application service 600 (S807). In response to the notification, the message application service 600 notifies the print bot service 500 of the selected language candidate and information on the user who has input the character string (S808). In response to the notification, the print bot service 500 stores the selected language candidate in the language setting 1204 of the account information table 1201 associated with the user who has input the character string (S809). Subsequently, the print bot service 500 has an interaction with the user who is an interaction target via the message application service 600 by using a language stored in the language setting 1204 of the account information table 1201 associated with the user. That is, due to the process of S809 describe above, the print bot service 500 sets a language used in an interaction with a user who is an interaction target. Thereby, the language using in an interaction with the user is switched from a default language or the like into the language of the user.

The print bot service 500 then searches for information that can identify printable data. The printable data corresponds to a file in a predefined format in the print bot service 500. For example, a file that is image data whose extension of the data is ".pdf", ".jpg", ".png", ".bmp", or the like or a file whose extension denotes a spreadsheet or a document is included in the printable data.

The print bot service 500 confirms the history in the chat room and searches for information that can identify printable data (S810). The history in S810 includes data that is information transmitted from the message application service 600 to the print bot service 500 in S801 described above and held in the database 550. Further, the history in S810 described above also includes data that can be obtained by inquiring of the file storage 610 of the message application service 600 from the print bot service 500. Further, information that can identify printable data is not required to be printable data itself and may be a URL where printable data is arranged or a local path.

In S810, if information that can identify printable data in the history is not found, the print bot service 500 directly requests the user to designate a print file as illustrated in the window 1005 of FIG. 10 (S811 to S814).

In details, in S811, the print bot service 500 transmits, to the message application service 600, a request for display that requests designation of information that can identify printable data. In response, the message application service 600 displays display that requests designation of information that can identify printable data on the chat room described above (S812). Accordingly, display that requests designation of information that can identify printable data as a chat box 1005 of FIG. 10 is displayed on the chat room displayed on the monitor 110 of the client computer 100.

Then, when the user inputs information that can identify printable data from this display, the client computer 100 notifies the message application service 600 of the input information that can identify printable data and information on the user who has input the information (S813). In response to this notification, the message application service 600 notifies the print bot service 500 of the information that can identify printable data and information on the user who has input the information (S814).

If the acquisition of information that can identify printable data is successful, the print bot service 500 temporarily stores the information that can identify printable data in the print job storage 510 or the database 550 (S815).

Next, the print bot service 500 transmits a request for display of a "Print" button to the message application service 600 (S816). In accordance with this request, the message application service 600 displays the "Print" button on the chat room described above (S817). Accordingly, the print button is displayed on the chat room displayed on the monitor 110 of the client computer 100.

The box 904 of FIG. 9 and the box 1010 of FIG. 10 are an example of the "Print" button. When the user selects the "Print" button, the client computer 100 transmits information indicating that the "Print" button has been selected and the information on the user who has input the information to the message application service 600 (S818). In response, the message application service 600 transmits a notification indicating that a "Print" button 903 has been selected to the print bot service 500 (S819).

After receiving the notification of S819 described above, the print bot service 500 requests printable data from the message application service 600 by using the information that can identify printable data stored in S815 described above (S820). In response, the message application service 600 acquires printable data from the file storage 610 or the like and transmits the printable data to the print bot service 500 (S821). The print bot service 500 temporarily stores printable data received from the message application service 600 in the print job storage 510 (S822). Although the printable data is acquired from the file storage 610 of the message application service 600 in S820 to S821 described above, the printable data may be acquired from the inside of the print bot service 500 or over the network.

In response to completion of storing data in S822 described above, the print bot service 500 determines whether or not there is an access token used for accessing the cloud print service 400. At this time, the print bot service 500 performs the determination by confirming the access token 1205 of the account information table 1201 included in the database 550 and associated with the user who has selected the "Print" button.

If a previously used access token is stored in the access token 1205 of the account information table 1201 of the database 550, the following process of S823 to S830 can be omitted. On the other hand, if no authority for the print bot service 500 to access the cloud print service 400, such as an access token or the like, is stored in the access token 1205, the cloud print service performs the following process of S823 to S830.

The print bot service 500 transmits an authentication request to the cloud print service 400 that is the destination of document data or image data registered in the message application service 600 when the data is printed (S823). In response to this request, the authorization server 440 of the cloud print service 400 notifies the print bot service 500 of a URL to display an authentication window used for user authentication (a URL for an authority authentication request) (S824).

In response to receiving the URL for an authority authentication request from the cloud print service 400, the print bot service 500 notifies the message application service 600 of the URL (S825). In response to this notification, the message application service 600 notifies the client computer 100 of the URL (S826). The client computer 100 accesses the notified URL and displays, on a chat room, an authentication information input window used for inputting authentication information for login to the cloud print service 400 (S827). The window 905 of FIG. 9 is an example of the authentication information input window. The authentication information input window 905 is a window displayed by a web server on the client computer 100. Note that the content input to the authentication information input window is not limited to the above as long as it is information with which authentication to the cloud print service 400 can be performed.

When the user inputs authentication information to the cloud print service used by the user to the authentication information input window on the chat room, the client computer 100 transmits the input authentication information to the cloud print service 400 (S828). In response to receiving the authentication information transmitted from the client computer 100, the authorization server 440 of the cloud print service 400 performs authentication based on the received authentication information.

Note that, although only authentication is performed in this example, a window that inquires of the user whether or not to permit the print bot service 500 to access the cloud print service 400 may be displayed on the client computer 100 after the authentication is successful. In such a case, the cloud print service 400 proceeds with the process to S829 described later in accordance with that the print bot service 500 is permitted to access the cloud print service 400 by the user.

The cloud print service 400 issues an access token based on successful authentication and gives the issued access token to the print bot service 500 (S829). In response to receiving the access token transmitted from the cloud print service 400, the print bot service 500 stores the access token in the access token 1205 of the account information table 1201 associated with the user described above (S830).

Furthermore, the print bot service 500 transmits an acquisition request for printer queue information stored in the database 450 of the cloud print service 400 by using the acquired access token described above (S831). In response to this request, the cloud print service 400 transmits the printer queue information associated with the access token included in the request stored in the database 450 to the print bot service 500 (S832). By receiving this information, the print bot service 500 acquires a printer queue name and a print setting for the user. The print setting herein corresponds to a preset name of the status where a plurality of setting items are set. Note that the print bot service 500 may acquire a default print setting value associated with the user instead of information related to a preset. The print bot service 500 stores the acquired printer queue information in the printer queue 1207 of the account information table 1201 associated with the corresponding user (S833). Further, the print bot service 500 stores print setting values in the print setting 1206 of the account information table 1201 associated with the corresponding user.

The account information table 1201 held in the database 550 of the print bot service 500 will now be described with reference to FIG. 11. The account information table 1201 illustrated in FIG. 11 is stored in the database 550. The application ID 1202 is identification information used for identifying the message application service 600. The user ID 1203 is identification information used for identifying the user using the message application service 600. By referencing the application ID 1202 and the user ID 1203, it is possible to determine who is accessing to the print bot service 500 from which application.

The access token 1205 is a token by which the print bot service 500 accesses the cloud print service 400. The print setting 1206 is information on a preset displayed by the message application service 600. In the example illustrated in FIG. 11, two presets of "Default setting" and "2 in 1+Duplex" are set in the print setting 1206 of the account information table 1201. The preset "Default setting" indicates that monochrome and duplex printing are applied and the number of copies is one. The preset "2 in 1+Duplex" indicates that color and duplex printing are applied and the number of copies is one. The printer queue 1207 is one or a plurality of printer queue names registered in the cloud print service 400.

Note that, in the present embodiment, identification information on the user and device information on the printer are associated with each other and registered in the account information table 1201. However, group identification information identifying a group to which a plurality of users belong may be associated with device information on a printer. In such a case, the user belonging to a group identified by group identification information stored in a table may use a printer in the device information stored associated with the group identification information to perform printing.

Turning back to description of the sequence diagram of FIG. 8 below, the print bot service 500 transmits, to the message application service 600, a request for display of a printer queue associated with user identification information stored in the account information table 1201 (S834). In response to this request, the message application service 600 displays a printer queue name and a print setting on the chat room (S835). Accordingly, the printer queue name and a print setting are displayed on the chat room displayed on the monitor 110 of the client computer 100. Note that, when no printer is registered in the cloud print service 400, a notification indicating this and displayed on the chat room is provided.

The region 906 of FIG. 9 is an example of a window selected by a printer used for printing. When the user selects the control 907, printer queue names stored in the print bot service 500 are displayed in a form of a list. The user may select a printer queue name used for printing image data from printer names displayed in the list. Further, the region 908 of FIG. 9 is an example of a window that displays print settings. The "Default setting" and "2 in 1+Duplex" displayed in the region 908 are preset names, which are names set by the user when the user registered the preset in the cloud print service 400. Note that, although a list of presets of print settings is displayed in the region 908 in the present embodiment, the embodiment may be configured such that the user may provide any print setting in the region 908. For example, the embodiment may be configured such that a setting of the number of copies, a setting of color/monochrome printing, a setting of paper size, a setting of printing direction, a layout setting such as imposition at printing, or the like can be set in the region 908. Note that the "Print Start" button 909 is not yet displayed at this point of time.

When the user changes a printer queue to be used, the client computer 100 transmits information on the selected printer queue and information on the user who has input the information to the message application service 600 (S836).

In response, the message application service 600 notifies the print bot service 500 of the information on the selected printer queue and the information on the user who has input the information (S837).

In response to this notification, the print bot service 500 transmits, to the cloud print service 400, an inquiry as to whether or not the printer corresponding to the selected printer queue is available for printing or the like (S838). In response, the cloud print service 400 inquires the status of the printer 200 corresponding to the inquired printer queue (S839). In response to the inquiry, the printer 200 returns the status thereof to the cloud print service 400 (S840). The cloud print service 400 returns the received status of the printer 200 to the print bot service 500 (S841). Accordingly, the print bot service 500 acquires the status of the printer of the selected printer queue. The print bot service 500 may notify the message application service 600 of the acquired status information and cause the message application service to display the status of the printer.

In response to completion of acquisition of the printer status, the print bot service 500 transmits, to the message application service 600, a display request that requests the message application service 600 to display the "Print Start" button on the application (S842). Note that the timing of display, a print setting, and a display request of the "Print Start" button may be transmitted without a request for display of a print setting in S834 described above. In accordance with the request described above, the message application service 600 displays the "Print Start" button as illustrated in the box 909 of FIG. 9 on the chat room (S843). Accordingly, the "Print Start" button 909 is displayed on the chat room displayed on the monitor 110 of the client computer 100.

Here, the user intends to perform an operation to change the print setting by operating the client computer 100 (S844). In response to this operation, the client computer 100 transmits information on the changed print setting and information on the user who made the operation to the message application service 600 (S844). In response, the message application service 600 notifies the print bot service 500 of the information on the changed print setting and the information on the user who made the operation (S845). Note that the region 908 of FIG. 9 is displayed with the default setting being selected, and the print bot service 500 is notified of the default setting. Then, when the user changes a print setting, the changed print setting is notified to the print bot service 500. The print bot service 500 stores the changed print setting in the print service 540 (S846). The process of S844 to S846 described above is performed every time the user changes a print setting.

When the user operates the client computer 100 to select the "Print Start" button, information indicating that the "Print Start" button 909 has been selected and information on the user who made the selection are transmitted to the message application service 600 (S848). In response, the message application service 600 transmits a notification indicating that the "Print Start" button 909 has been selected to the print bot service 500 (S849). At this time, the message application service 600 may transmit a text of "Print Start" to the print bot service 500, for example, as a print instruction. The print bot service 500 analyzes the received text and, based on the print start being included, performs the process described in S850 illustrated below.

The print bot service 500 designates a printer queue based on the received print start instruction and transmits, to the cloud print service 400, the printable data temporarily stored in S822 described above and the print setting stored in S833 and S846 described above (S850). That is, the print bot service 500 transmits the print setting and a print job to the cloud print service 400.

The cloud print service 400 that has received the print setting and the print job transmits, to the printer 200 corresponding to the specified printer queue, a print job to which the print setting is reflected (S851). If the printing is successful, the printer 200 transmits a notification to the effect that the printing is successful to the cloud print service 400. The print bot service 500 performs polling on the cloud print service 400 and, in response to detecting successful printing, requests the message application service 600 to display the completion of the printing. The region 910 of FIG. 9 corresponds to a notification indicating that printing is completed.

Note that, in the example illustrated in FIG. 8, the case where data registered in the message application service 600 by a user is printed in accordance with the user's operation has been described as an example. However, data registered in the message application service 600 by another user or another client computer may be printed. By enabling data registered by another user or another client computer to be printed, even when the client computer does not store the data to be printed, it is possible to perform printing of the data.

Figure 15B:
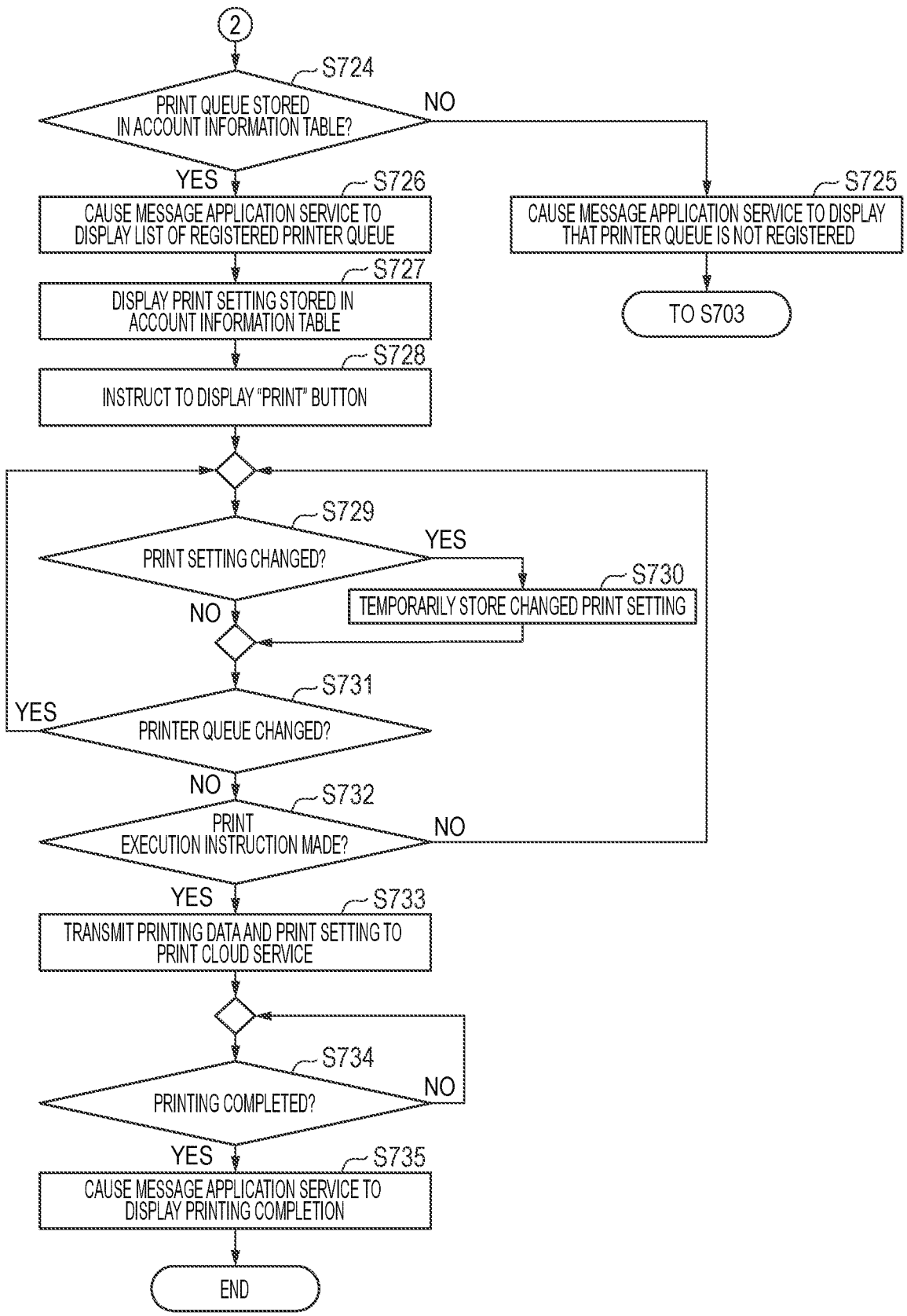
FIG. 15B is a flowchart illustrating one example of a process performed by the print bot service.

Next, the process performed by the print bot service 500 in the present embodiment will be illustrated with reference to FIG. 15A and FIG. 15B. FIG. 15A and FIG. 15B are flowcharts illustrating an example of a process performed by the print bot service 500 of the present embodiment. This process, namely, the process described below is performed when one or more CPUs of one or a plurality of computers execute a program stored in any of one or a plurality of computers forming the print bot service 500. Further, this process is started when the user uses the message application service 600 to open a screen of a chat room that the print bot service 500 participates in. Note that FIG. 15A and FIG. 15B are collectively referred to as FIG. 15 below.

First, the processing unit 530 of the print bot service 500 accepts a notification indicating that the screen of a chat room is opened from the message application service 600 and performs a startup process (S701).

The processing unit 530 sets the print bot service 500 to a state where data registered in the message application service 600 is ready to be received as data that the user intends to print (S702). The processing unit 530 manages the status of the message application service 600 and changes the status of the message application service 600 to a data registration standby state.

The processing unit 530 then determines whether or not a notification indicating that the user input data is registered is received from the message application service 600 (S703). If the notification indicating that the user input data is registered is not received from the message application service 600 (S703, No), the processing unit 530 repeats the process of S703. On the other hand, if the notification indicating that the user input data is registered is received from the message application service 600 (S703, Yes), the processing unit 530 proceeds with the process to S704.

In S704, the processing unit 530 acquires, from the message application service 600, the data registered in the message application service 600 by the user and the name of the user who has input the data. Furthermore, the processing unit 530 uses the account information table 1201 of the database 550 to acquire language setting information on the user who has input the data.

Further, the processing unit 530 confirms whether or not a character string matching the print keyword table 1301 of the database 550 is present in the character string registered by the user (S705). If no matching character string is present in the character string registered by the user (S706, No), the processing unit 530 returns to the data waiting process of S703 described above.

On the other hand, if a character string matching the print keyword table 1301 is included in the character string registered by the user (S706, Yes), the processing unit 530 proceeds with the process to S707. In S707, the processing unit 530 determines whether or not a language setting for the user who has input the data is included in the account information table 1201 of the database 550. If a language setting for the user who has input the data is included in the account information table 1201 of the database 550 (S707, Yes), the processing unit 530 proceeds with the process to S712.

On the other hand, if no language setting for the user who has input the data is included in the account information table 1201 of the database 550 (S707, No), the processing unit 530 performs a language setting storing process for the user (S708 to S711). Note that, also when a language setting is already included in the account information table 1201, a language setting start confirmation window may be presented to the user from the message application service, and when start of the language setting is selected, the language setting storing process (S708 to S711) may be performed.

The language setting storing process (S708 to S711) will be described. First, the processing unit 530 analyzes the language of the user who has input data from the character string registered by the user (S708). An example of an analysis method will be illustrated. First, it is confirmed whether or not a character string matching the print related keyword information 1303 of the print keyword table 1301 is present in the character string registered by the user. If a matching character string is present, a language setting associated with the matching character string is confirmed. It is then confirmed whether or not the language setting is uniquely defined. If the language setting is uniquely defined, the language setting is determined as a language for the user who has input the data. On the other hand, if the same print keyword is associated with a plurality of language settings and the language setting is not uniquely defined, it is confirmed whether or not a character matching the language specific character table 1501 is present in the character string registered by the user. Note that the language specific character table 1501 is a table in which characters used in only the particular language and language settings are associated with each other and managed. If a character string matching the language specific character table 1501 is present in the character string registered by the user, the language corresponding to the matching character string is determined as a language for the user who has input the data. On the other hand, no character string matching the language specific character table 1501 is present in the character string registered by the user, it is determined that the language for the user who has input the data was not identified.

If the language setting for the user who has input the data is determined (S709, Yes), the processing unit 530 proceeds with the process to S711. On the other hand, if the language setting for the user who has input the data is not determined (S709, No), the processing unit 530 proceeds with the process to S710. In S710, the processing unit 530 posts a message including language choices as illustrated in the window 1001 of FIG. 10 to the message application service 600 and requests the user who has input the data to directly input a language setting. Then, in response to receiving a result of selection of a language setting made by the user who has input the data from the message application service 600, the processing unit 530 proceeds with the process to S711.

In S711, the processing unit 530 stores the language setting for the user who has input the data in the language setting 1204 of the account information table 1201 associated with the user who has input the data. This switches the language used for exchanging a message with the user who has input the data. The processing unit 530 then proceeds with the process to S712.

In S712, the processing unit 530 confirms whether or not information that can identify printable data is included in the character string registered by the user. As described above, the printable data refers to a file in a format predefined with the print bot service 500. The printable data may be, for example, a file that is image data whose extension is ".pdf", ".jpg", ".png", ".bmp", or the like or a file whose extension represents a spreadsheet or a document.

If no printable data is included (S713, No), the processing unit 530 proceeds with the process to S714. In S714, the processing unit 530 transmits a message as illustrated in the region 1005 to the message application service 600 and requests the user who has input the data to input information identifying printable data. Then, in response to receiving information identifying printable data input by the user who has input the data from the message application service 600, the processing unit 530 proceeds with the process to S715. On the other hand, if printable data is included (S713, Yes), the processing unit 530 proceeds with the process to S715.

In S715, the processing unit 530 temporarily stores the information that can identify printable data in the database 550 or the print job storage 510. The processing unit 530 instructs the message application service 600 to display the "Print" button (S716).

Next, the processing unit 530 determines whether or not a notification indicating that the user has selected the "Print" button is received from the message application service 600 (S717). If the notification indicating that the user has selected the "Print" button is received (S717, Yes), the processing unit 530 performs the process of S718 and subsequent steps.

On the other hand, if the notification indicating that the user has selected the "Print" button is not received (S717, No), the processing unit 530 of the print bot service 500 stands by in the process of waiting for pressing of the "Print" button of S717. Note that, when a predetermined period has elapsed from the time of issuing an instruction for displaying the "Print" button or when the next data registration is performed by the user without the "Print" button being selected, the processing unit 530 may return the process to S703. Further, when returning the process to S703, the processing unit 530 may hide the "Print" pressing button that has been displayed to the user in S716. By doing so, even when the user does not print data registered in the message application service 600, it is possible to perform a process on the next registered data.

In S718, the processing unit 530 references the account information table 1201. The processing unit 530 then determines whether or not identification information (application ID) of the connected message application service 600 and an access token corresponding to the user who has selected the "Print" button are registered (S718). The processing unit 530 identifies from which application ID of which user the printing is instructed from the notification indicating that the "Print" button has been selected, for example, based on data registered in the account information table 1201. If an access token corresponding to the application ID and the user name is registered (S718, Yes), the processing unit 530 proceeds with the process to S722.

On the other hand, no access token corresponding to identification information on the message application service 600 is registered (S718, No), the processing unit 530 proceeds with the process with S719. In S719, the processing unit 530 causes the client computer 100 to display an authentication information input window. In details, the processing unit 530 transmits an authentication request for user authority to the cloud print service 400. In response to the authentication request, the cloud print service 400 returns an URL required for display of the authentication window to the print bot service 500. The processing unit 530 transmits the URL to the message application service 600. The URL is transmitted to the client computer 100 via the message application service 600. Accordingly, the authentication information input window as illustrated in the region 905 of FIG. 9 is displayed.

The processing unit 530 determines whether or not information required for acquisition of an access token from the cloud print service 400 is acquired (S720). If the user authentication is successful, the cloud print service 400 transmits information required for acquisition of an access token to the print bot service 500 via the message application service 600. The processing unit 530 stands by until the print bot service 500 acquires information required for acquisition of an access token. Then, if the print bot service 500 acquires information required for acquisition of an access token (S720, Yes), the processing unit 530 proceeds with the process to S721. Note that, if a predetermined period elapses before the print bot service 500 acquires information required for acquisition of an access token, the process may be returned to S703.

In S721, the processing unit 530 uses the above information required for acquisition of an access token to acquire the access token from the cloud print service 400 (S721). Furthermore, the processing unit 530 registers the acquired access token as the access token 1205 of the account information table 1201 associated with the user subjected to the above user authentication and managed by the database 550 and proceeds with the process to S722.

In S722, the processing unit 530 accesses the cloud print service 400 by using an access token registered in the account information table 1201 associated with the user who has input the data and acquires printer queue information and a print setting. Next, the processing unit 530 stores the printer queue information and the print setting acquired in S722 described above in the account information table 1201 of the database 550 (S723).

Furthermore, the processing unit 530 determines whether or not a printer queue associated with the user using the message application service 600 is present in the account information table 1201 (S724). If no printer queue associated with the user using the message application service 600 is registered in the account information table 1201 (S724, No), the processing unit 530 proceeds with the process to S725. In S725, the processing unit 530 requests the message application service 600 to display a message indicating that no printer is registered and returns the process to S703.

On the other hand, if a printer queue associated with the user using the message application service 600 is stored in the account information table (S724, Yes), the processing unit 530 performs the process of S726 and subsequent steps. In S726, the processing unit 530 requests the message application service 600 to display a printer name corresponding to the printer queue 1207 stored in the account information table 1201 in association with the identification information on the authenticated user described above. Accordingly, the region 906 illustrated in FIG. 9 is displayed.

Next, the processing unit 530 requests the message application service 600 to display the print setting 1206 stored in the account information table 1201 in association with the authenticated user described above (S727). In the present embodiment, name information on a preset registered in the cloud print service 400 as a set of print settings in advance is acquired and displayed on the message application service 600.

Next, the processing unit 530 requests the message application service 600 to display the "Print Start" button 909 in accordance with completion of acquisition of the status of a printer queue. Note that, although the "Print Start" button 909 is displayed after the status of a printer queue is acquired in the present embodiment, the "Print Start" button 909 may be displayed without acquisition of the status of a printer queue.

Next, the processing unit 530 determines whether or not the print setting has been changed (S729). If the user has changed the print setting in the region 908, the message application service 600 notifies the print bot service 500 of an event. Based on the notification of the event of changing the print setting, the processing unit 530 of the print bot service 500 determines that the print setting has been changed. If the print setting has been changed (S729, Yes), the processing unit 530 proceeds with the process to S730. In S730, the processing unit 530 stores the changed print setting in the print service 540 and proceeds with the process to S731.

On the other hand, if the print setting has not been changed (S729, No), the processing unit 530 proceeds with the process to S731.

In S731, the processing unit 530 determines whether or not the printer queue has been changed. When the user changes a printer queue, the change is notified to the print bot service 500 as an event. In response to receiving the event, the processing unit 530 of the print bot service 500 determines that the printer queue has been changed. If the printer queue has been changed (S731, Yes), the processing unit 530 returns the process to S729 and acquires the status of a printer corresponding to the changed printer queue for the cloud print service 400.

On the other hand, if the printer queue has not been changed (S731, No), the processing unit 530 proceeds with the process to S732. In S732, the processing unit 530 determines whether or not start of printing has been instructed. When the user selects the "Print Start" button 909 of the region 908, the message application service 600 detects the event and notifies the print bot service 500. In response to receiving the event indicating that the user has selected the "Print Start" button from the message application service 600, the processing unit 530 determines that start of printing is instructed. If start of printing is not instructed (S732, No), the processing unit 530 returns the process to S734.

On the other hand, if start of printing is instructed (S732, Yes), the processing unit 530 proceeds with the process to S733. In S733, the processing unit 530 transmits print data stored in the print job storage 510 and a print setting stored in the print service 540 to the cloud print service 400. In details, the print service 540 acquires a print job from the print job storage 510 and associates the print job with a print setting. The processing unit 530 transmits the print job and the print setting associated with each other by the print service 540 to the cloud print service 400. Accordingly, the print job is transmitted to the cloud print service 400, and printing of document data or image data registered in the message application service 600 can be performed.

After transmitting the data to be printed and the print setting to the cloud print service 400, the processing unit 530 inquires of the cloud print service 400 whether or not the printing is completed (S734). In details, the processing unit 530 transmits an inquiry as to whether or not the printing is completed to the cloud print service 400 through periodical polling. Based on the notification received from the cloud print service 400, the processing unit 530 determines whether or not the printing is completed. Note that the cloud print service 400 may notify the processing unit 530 that printing is completed, and the processing unit 530 may determine the completion of printing based on the notification.

The processing unit 530 stands by until the printing is completed, and if the printing is completed (S734, Yes), proceeds with the process to S735. In S735, the processing unit 530 transmits a request for displaying print completion to the message application service 600. This enables the user to know the completion of printing via the message application service 600.

As described above, the print bot service 500 accesses another service (for example, the cloud print service 400) in which printer information is already registered, and this enables printing using a printer registered in another service.

Note that the function of the print bot service 500 and the function of the cloud print service 400 may be provided to the printer 200. Further, the client application used for the message application service 600 operating on the client computer 100 may acquire a language setting of the client computer 100 and notify the message application service 600 of the acquired language setting. In such a case, the message application service 600 notifies the print bot service 500 of the language setting of the client computer 100. Furthermore, when failing to determine an input language, for example, the print bot service 500 may register the language setting of the client computer 100 in the language setting 1204 in the account information table 1201 (FIG. 11) associated with the corresponding user.

Furthermore, a client application used for the message application service 600 operating on the client computer 100 may notify the message application service 600 of the language setting set in the user interface (UI) of the client application. In such a case, the message application service 600 notifies the print bot service 500 of the language setting of the client computer 100. Furthermore, when failing to determine the input language, for example, the print bot service 500 registers the language setting, which is set in the UI of the client application, to the language setting 1204 in the account information table 1201 associated with the corresponding user.

As described above, according to the present embodiment, in a cloud print environment using a message application service, it is possible to set a suitable language setting by country on a user basis. As a result, it is possible to interact with a bot service and perform printing in a suitable language by country on a user basis. This can improve user-friendliness in a cloud print environment using a message application service. For example, a print setting window or an operation instruction can be displayed in a language suitable for a user, and this enables a print instruction or the like to be provided in a language of the user's country and can improve user-friendliness. Further, by performing language determination using a character string input by the user to the message application service, it is possible to determine a language directly from a character string input by the user, and it is therefore possible to perform language determination with high determination accuracy.

Note that it goes without saying that the configuration and the content of various data described above are not limited thereto and may be formed of various configurations and contents in accordance with the use and the purpose. Although one embodiment has been illustrated above, the present disclosure includes embodiments including a system, an apparatus, a method, a program, a storage medium, or the like, for example. Specifically, the present disclosure includes a system formed of a plurality of devices or may be applied to an apparatus formed of a single device. Further, all the configurations combining any of the embodiments described above are included in the present disclosure.

OTHER EMBODIMENTS

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-082153, filed May 7, 2020, which is hereby incorporated by reference herein in its entirety.

What is claimed is:

1. A server system comprising:
a controller configured to:
receive a message from a message application service;
determine whether the received message is related to printing;
specify a language used in the received message, in a case that it is determined that the received message is related to printing based on data uploaded to the message application service; and
transmit, to the message application service, information to display, on the message application service, an object for receiving an instruction relating to the printing, the object being an object of the specified language,
wherein, in a case where the controller is not able to specify the language used in the received message, information for displaying, on the message application service, an object for receiving selection of a language by a user is transmitted to the message application service.

2. The server system according to claim 1, wherein the controller determines whether the received message is related to the printing based on a word included in the received message.

3. The server system according to claim 1, wherein the language is specified based on one or more characters included in the received message.

4. The server system according to claim 1, further comprising:
a memory configured to store words related to printing in multiple languages, wherein the controller determines whether the received message is related to printing based on the stored words.

5. The server system according to claim 1, wherein the transmitted information is corresponding to a message related to selection of a printer to be used for printing.

6. The server system according to claim 1, wherein the transmitted information is related to a print setting.

7. The server system according to claim 1, wherein the controller stores, to a storage, language information of the selected language in association with the user.

8. An information processing method for controlling a server system, the information processing method comprising:
receiving a message from a message application service;
determining whether the received message is related to printing;
specifying a language used in the received message, in a case that it is determined that the received message is related to printing based on data uploaded to the message application service; and
transmitting, to the message application service, information to display, on the message application service, an object for receiving an instruction relating to the printing, the object being an object of the specified language,
wherein, in a case where the language used in the received message is not identifiable, information for displaying, on the message application service, an object for receiving selection of a language by a user is transmitted to the message application service.

9. The information processing method according to claim 8, wherein it is determined that the received message is a message related to printing, in a case where the received message includes at least one word related to printing in multiple languages.

10. The information processing method according to claim 8, wherein the transmitted information is corresponding to a message related to selection of a printer to be used for printing.

11. The information processing method according to claim 8, wherein the transmitted information is related to a print setting.

12. The information processing method according to claim 8, further comprising:
- storing, to a storage, language information of the selected language in association with the user.

13. A non-transitory computer-readable storage medium storing computer-executable instructions that, when executed by a computer, cause the computer to perform a control method for a server system, the control method comprising:
- receiving a message from a message application service;
- determining whether the received message is related to printing;
- specifying a language used in the received message, in a case that it is determined that the received message is related to printing based on data uploaded to the message application service; and
- transmitting, to the message application service, information to display, on the message application service, an object for receiving an instruction relating to the printing, the object being an object of the specified language,
- wherein, in a case where the language used in the received message is not identifiable, information for displaying, on the message application service, an object for receiving selection of a language by a user is transmitted to the message application service.

\* \* \* \* \*